US012724518B2

(12) United States Patent
Jeong et al.

(10) Patent No.: US 12,724,518 B2
(45) Date of Patent: Sep. 1, 2026

(54) ELECTRONIC DEVICE

(71) Applicant: Samsung Display Co., Ltd., Yongin-si (KR)

(72) Inventors: Joo-Hyeon Jeong, Yongin-si (KR); Gwang-Bum Ko, Yongin-si (KR); Kangwon Lee, Yongin-si (KR); Sanghyun Lim, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 19/182,186

(22) Filed: Apr. 17, 2025

(65) Prior Publication Data

US 2026/0161255 A1 Jun. 11, 2026

(30) Foreign Application Priority Data

Apr. 26, 2024 (KR) ........................ 10-2024-0055781

(51) Int. Cl.
*G06F 3/044* (2006.01)
*G06F 3/046* (2006.01)

(52) U.S. Cl.
CPC .......... *G06F 3/0446* (2019.05); *G06F 3/0445* (2019.05); *G06F 3/046* (2013.01);
(Continued)

(58) Field of Classification Search
CPC .. G06F 3/03545; G06F 1/1652; G06F 3/0446; G06F 3/0445; G06F 3/046;
(Continued)

(56) References Cited

U.S. PATENT DOCUMENTS 11,983,357 B2 5/2024 Kim et al.
2020/0303955 A1* 9/2020 Kim ...................... G06F 1/1652
(Continued)

FOREIGN PATENT DOCUMENTS

CN 115244496 A 10/2022
CN 117827039 A 4/2024
(Continued)

OTHER PUBLICATIONS

Extended European Search Report issued in corresponding EP Application No. 25169864.3, dated Sep. 22, 2025 (11 pages).

*Primary Examiner* — Robin J Mishler

(74) *Attorney, Agent, or Firm* — Womble Bond Dickinson (US) LLP

(57) ABSTRACT

An electronic device includes: a sensor layer to be folded or unfolded about a folding axis extending in a first direction; and a sensor driver to drive the sensor layer. The sensor layer includes: first electrodes along the first direction; second electrodes along a second direction crossing the first direction; a first electrode group including first auxiliary electrodes along the second direction; a first auxiliary trace line electrically connected with the first auxiliary electrodes; a first signal transmission line electrically connected with a first-first auxiliary electrode among the first auxiliary electrodes; and a second signal transmission line electrically connected with a first-second auxiliary electrode spaced from the first-first auxiliary electrode in the second direction among the first auxiliary electrodes. The sensor driver is to sense a folding of the sensor layer by sensing an induced current induced by the first-first auxiliary electrode and the first-second auxiliary electrode.

20 Claims, 21 Drawing Sheets

(52) U.S. Cl.
CPC .............. *G06F 2203/04102* (2013.01); *G06F 2203/04106* (2013.01); *G06F 2203/04114* (2019.05)

(58) Field of Classification Search
CPC . G06F 2203/04114; G06F 2203/04102; G06F 2203/04106
See application file for complete search history.

(56) References Cited

U.S. PATENT DOCUMENTS

2020/0333836 A1* 10/2020 Kim .................... G06F 3/03545
2021/0048926 A1 2/2021 Woo et al.
2024/0329785 A1* 10/2024 Ko ........................ G06F 3/0443

FOREIGN PATENT DOCUMENTS

KR 10-2394081 B1 5/2022
KR 10-2412371 B1 6/2022

* cited by examiner

ELECTRONIC DEVICE

CROSS-REFERENCE TO RELATED APPLICATION

The present application claims priority to and the benefit of Korean Patent Application No. 10-2024-0055781, filed on Apr. 26, 2024, in the Korean Intellectual Property Office, the entire disclosure of which is incorporated by reference herein.

BACKGROUND

1. Field

Aspects of embodiments of the present disclosure relate to an electronic device capable of sensing a degree to which the electronic device is folded.

2. Description of the Related Art

Multimedia electronic devices, such as a television, a mobile phone, a tablet computer, a notebook computer, a car navigation unit, a game machine, and the like, include a display device for displaying an image. The electronic devices may include a sensor layer (e.g., an input sensor) capable of providing a touch-based input method that enables a user to intuitively and conveniently input information or instructions in an easy and simple manner, in addition to other input methods, such as a button, a keyboard, a mouse, or the like. The sensor layer may sense the user's touch or pressure.

The above information disclosed in this Background section is for enhancement of understanding of the background of the present disclosure, and therefore, it may contain information that does not constitute prior art.

SUMMARY

One or more embodiments of the present disclosure may be directed to an electronic device including a sensor layer for sensing a degree to which the electronic device is folded.

According to one or more embodiments of the present disclosure, an electronic device includes: a sensor layer configured to be folded or unfolded about a folding axis extending in a first direction; and a sensor driver configured to drive the sensor layer. The sensor layer includes: a plurality of first electrodes along the first direction; a plurality of second electrodes along a second direction crossing the first direction; a first electrode group including a plurality of first auxiliary electrodes along the second direction; a first auxiliary trace line electrically connected with the plurality of first auxiliary electrodes; a first signal transmission line electrically connected with a first-first auxiliary electrode among the plurality of first auxiliary electrodes; and a second signal transmission line electrically connected with a first-second auxiliary electrode spaced from the first-first auxiliary electrode in the second direction among the plurality of first auxiliary electrodes. The sensor driver is configured to sense a folding of the sensor layer by sensing an induced current induced by the first-first auxiliary electrode and the first-second auxiliary electrode.

In an embodiment, the sensor driver may be configured to sense the folding based on at least the induced current received from at least some of the plurality of second electrodes.

In an embodiment, the sensor layer may include a sensing area, and a peripheral area adjacent to the sensing area. The plurality of first electrodes, the plurality of second electrodes, and the first electrode group may be located in the sensing area. The first auxiliary trace line and the first signal transmission line may be spaced from each other with the sensing area therebetween, and the first auxiliary trace line and the second signal transmission line may be spaced from each other with the sensing area therebetween.

In an embodiment, the sensor driver may be configured to selectively operate in a first mode to sense a touch input, a second mode to sense a pen input, and a third mode to sense the folding of the sensor layer. In the third mode, the sensor driver may be configured to provide a first signal to the first signal transmission line, and a second signal to the second signal transmission line, the second signal being an inverse signal of the first signal.

In an embodiment, an operation period of the third mode may be greater than or equal to an operation period of the first mode.

In an embodiment, the sensor layer may further include: a third signal transmission line electrically connected with a first-third auxiliary electrode among the plurality of first auxiliary electrodes; and a fourth signal transmission line electrically connected with a first-fourth auxiliary electrode spaced from the first-third auxiliary electrode in the second direction among the plurality of first auxiliary electrodes. The first-third auxiliary electrode and the first-fourth auxiliary electrode may be closer to the folding axis than the first-first auxiliary electrode and the first-second auxiliary electrode.

In an embodiment, the sensor driver may be configured to sense the folding of the sensor layer in a mode including a first section mode and a second section mode. In the first section mode, the sensor driver may be configured to provide a first signal and a second signal to the first-first auxiliary electrode and the first-second auxiliary electrode, respectively, the second signal being an inverse signal of the first signal. In the second section mode, the sensor driver may be configured to provide the first signal and the second signal to the first-third auxiliary electrode and the first-fourth auxiliary electrode, respectively.

In an embodiment, the sensor layer may further include: a second electrode group including a plurality of second auxiliary electrodes along the second direction; and a second auxiliary trace line electrically connected with the plurality of second auxiliary electrodes. The first electrode group and the second electrode group may be spaced from each other with the folding axis therebetween.

In an embodiment, the folding axis may include a first folding axis extending in the first direction, and a second folding axis extending in the first direction and spaced from the first folding axis in the second direction. The sensor layer may be configured to be folded or unfolded about the first folding axis and the second folding axis. The sensor layer may include a first non-folding area, a first folding area, a second non-folding area, a second folding area, and a third non-folding area sequentially along the second direction. The first folding area may be configured to be folded or unfolded about the first folding axis, and the second folding area may be configured to be folded or unfolded about the second folding axis.

In an embodiment, the first-first auxiliary electrode and the first-second auxiliary electrode may be located in the second non-folding area.

In an embodiment, the sensor layer may further include: a third signal transmission line electrically connected with a first-third auxiliary electrode among the plurality of first auxiliary electrodes; and a fourth signal transmission line electrically connected with a first-fourth auxiliary electrode spaced from the first-third auxiliary electrode in the second direction among the plurality of first auxiliary electrodes. The first-first auxiliary electrode and the first-second auxiliary electrode may be located in the first non-folding area, and the first-third auxiliary electrode and the first-fourth auxiliary electrode may be located in the second non-folding area or the third non-folding area.

In an embodiment, the sensor layer may further include a plurality of charging electrode groups along the first direction, and the plurality of charging electrode groups may overlap with the plurality of first electrodes.

According to one or more embodiments of the present disclosure, an electronic device includes: a sensor layer configured to be folded or unfolded about a folding axis extending in a first direction; and a sensor driver configured to drive the sensor layer by selectively operating in a first mode to sense a touch input, a second mode to sense a pen input, or a third mode to sense a folding of the sensor layer. The sensor layer includes: a plurality of first electrodes along the first direction; a plurality of second electrodes along a second direction crossing the first direction; a first electrode group including a plurality of first auxiliary electrodes along the second direction; a first auxiliary trace line electrically connected with the plurality of first auxiliary electrodes; a first signal transmission line electrically connected with a first-first auxiliary electrode among the plurality of first auxiliary electrodes; and a second signal transmission line electrically connected with a first-second auxiliary electrode spaced from the first-first auxiliary electrode in the second direction among the plurality of first auxiliary electrodes. In the third mode, the sensor driver is configured to provide a first signal to the first signal transmission line, and a second signal to the second signal transmission line, the second signal being an inverse signal of the first signal.

In an embodiment, an operation period of the third mode may be greater than or equal to an operation period of the first mode.

In an embodiment, in the third mode, the sensor driver may be configured to sense the folding of the sensor layer by sensing an induced current induced in the plurality of second electrodes by the first-first auxiliary electrode and the first-second auxiliary electrode.

In an embodiment, the sensor layer may further include: a third signal transmission line electrically connected with a first-third auxiliary electrode among the plurality of first auxiliary electrodes; and a fourth signal transmission line electrically connected with a first-fourth auxiliary electrode spaced from the first-third auxiliary electrode in the second direction among the plurality of first auxiliary electrodes. The first-third auxiliary electrode and the first-fourth auxiliary electrode may be closer to the folding axis than the first-first auxiliary electrode and the first-second auxiliary electrode.

In an embodiment, the sensor layer may further include a plurality of charging electrode groups along the first direction, and the plurality of charging electrode groups may overlap with the plurality of first electrodes.

According to one or more embodiments of the present disclosure, an electronic device includes: a sensor layer configured to be folded or unfolded about a folding axis extending in a first direction; and a sensor driver configured to drive the sensor layer by selectively operating in a first mode to sense a touch input, a second mode to sense a pen input, or a third mode to sense a folding of the sensor layer. The sensor layer includes: a plurality of first electrodes; a plurality of second electrodes crossing the plurality of first electrodes; and a plurality of auxiliary electrodes extending in the first direction, and located along a second direction crossing the first direction. In the third mode, the sensor driver is configured to sense the folding of the sensor layer by sensing an induced current induced by at least two auxiliary electrodes among the plurality of auxiliary electrodes.

In an embodiment, the sensor layer may further include: a first signal transmission line electrically connected with a first-first auxiliary electrode among the plurality of auxiliary electrodes; and a second signal transmission line electrically connected with a first-second auxiliary electrode spaced from the first-first auxiliary electrode in the second direction among the plurality of auxiliary electrodes. In the third mode, the sensor driver may be configured to provide a first signal to the first signal transmission line, and a second signal to the second signal transmission line, the second signal being an inverse signal of the first signal.

In an embodiment, the plurality of first electrodes may be located along the first direction, and the plurality of second electrodes may be located along the second direction. The sensor driver may be configured to sense the folding based on at least the induced current received from at least some of the plurality of second electrodes.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1A:
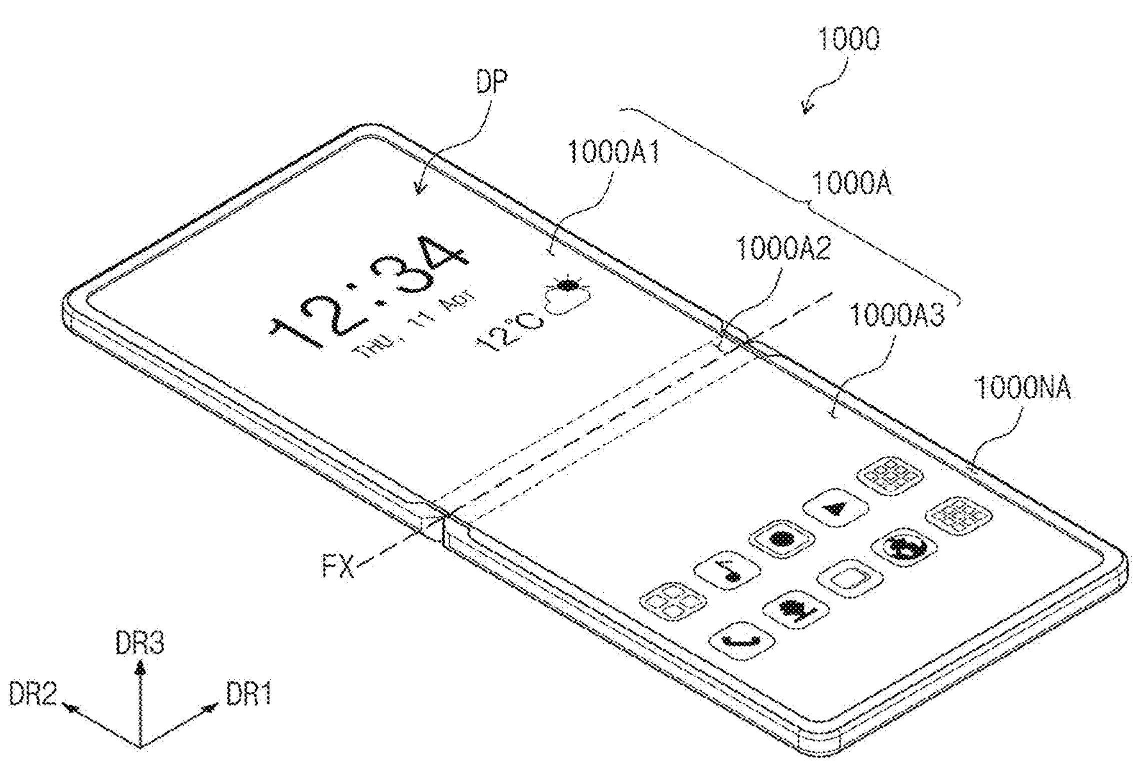
FIG. 1A is a perspective view of an electronic device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

As used herein, terms "part" and "unit" may refer to a software component or a hardware component that performs a specific function. The hardware component may include, for example, a field-programmable gate array (FPGA) or an application-specific integrated circuit (ASIC). The software component may refer to executable code and/or data used by executable code in an addressable storage medium. Thus, software components may be, for example, object-oriented software components, class components, and working components, and may include processes, functions, properties, procedures, subroutines, program code segments, drivers, firmware, micro-codes, circuits, data, databases, data structures, tables, arrays, or variables.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
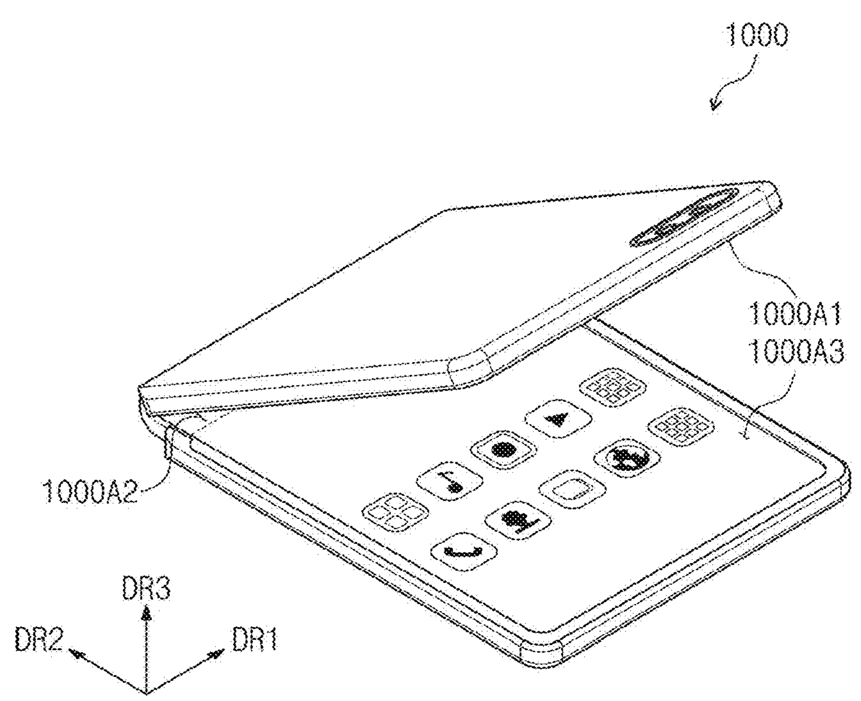
FIG. 1B is a perspective view of the electronic device according to an embodiment of the present disclosure.

FIG. 1A is a perspective view of an electronic device 1000 according to an embodiment of the present disclosure. FIG. 1B is a perspective view of the electronic device 1000 according to an embodiment of the present disclosure. FIG. 1A illustrates an unfolded state of the electronic device 1000, and FIG. 1B illustrates a state in which the electronic device 1000 is being folded, or in other words, a partially folded state of the electronic device 1000.

Referring to FIGS. 1A and 1B, the electronic device 1000 may be a device that is activated depending on an electrical signal. For example, the electronic device 1000 may be a mobile phone, a tablet computer, a car navigation unit (e.g., a car navigator), a game machine, or a wearable device, but the present disclosure is not limited thereto. In FIGS. 1A and 1B, the electronic device 1000 is illustrated as a mobile phone.

The electronic device 1000 may display an image through an active area 1000A. In the unfolded state of the electronic device 1000, the active area 1000A may include a plane defined by a first direction DR1 and a second direction DR2. The thickness direction of the electronic device 1000 may be parallel to or substantially parallel to a third direction DR3 that crosses the first direction DR1 and the second direction DR2. Accordingly, front surfaces (e.g., upper surfaces) and rear surfaces (e.g., lower surfaces) of the members constituting the electronic device 1000 may be defined based on the third direction DR3.

The active area 1000A may include a first area 1000A1, a second area 1000A2, and a third area 1000A3. The second area 1000A2 may be bent about a folding axis FX extending in the first direction DR1. Accordingly, the first area 1000A1 and the third area 1000A3 may be referred to as non-folding areas, and the second area 1000A2 may be referred to as a folding area.

When the electronic device 1000 is folded, the first area 1000A1 and the third area 1000A3 may face each other. Accordingly, in a fully folded state, the active area 1000A may not be exposed to the outside, which may be referred to as an in-folding or in-folded operation. However, the present disclosure is not limited thereto, and the operation of the electronic device 1000 is not limited thereto.

In an embodiment of the present disclosure, the electronic device 1000 may perform both an in-folding operation and an out-folding operation. In the out-folding operation, when the electronic device 1000 is folded, the first area 1000A1 and the third area 1000A3 may face away from each other. Accordingly, in the folded state, the active area 1000A may be exposed to the outside, and this may be referred to as the out-folding operation. The same area of the electronic device 1000, for example, such as the second area 1000A2, may be folded in the in-folding or the out-folding manner. As another example, one partial area of the electronic device 1000 may be folded in the in-folding manner, and another partial area of the electronic device 1000 may be folded in the out-folding manner.

Although one folding area and two non-folding areas are illustrated as an example in FIGS. 1A and 1B, the numbers of folding areas and non-folding areas are not limited thereto. For example, the electronic device 1000 may include more than two non-folding areas and a plurality of folding areas, each of which is disposed between non-folding areas that are adjacent to each other among the non-folding areas.

In FIGS. 1A and 1B, the folding axis FX is illustrated as being parallel to or substantially parallel to the short axis of the electronic device 1000. However, the present disclosure is not limited thereto. For example, the folding axis FX may extend in a direction parallel to or substantially parallel to the long axis of the electronic device 1000, for example, in a direction parallel to or substantially parallel to the second direction DR2. In this case, the first area 1000A1, the second area 1000A2, and the third area 1000A3 may be sequentially arranged along the first direction DR1.

The electronic device 1000 may include a display panel DP. The display panel DP may sense an external input applied from the outside. The external input may be a user input. The user input may include various suitable kinds of external inputs, such as a part of a user's body, a pen PN (e.g., refer to FIG. 3), light, heat, or pressure.

According to an embodiment of the present disclosure, the display panel DP may sense an input by the pen PN without using or including a digitizer. Because the digitizer for sensing the pen PN may be omitted, an increase in the thickness and the weight of the electronic device 1000 depending on the addition of a digitizer may not occur.

According to an embodiment of the present disclosure, the electronic device 1000 may sense whether or not the electronic device 1000 is folded, or the degree to which the electronic device 1000 is folded, through a sensor layer included in the display panel DP. Accordingly, a separate module for sensing the folding may be omitted, so that manufacturing costs may be reduced. In addition, because the separate module may be omitted, a space may be secured. Detailed description thereabout will be given below.

In an embodiment of the present disclosure, the electronic device 1000 may further include a magnet disposed in the first area 1000A1, and a Hall sensor disposed in the third area 1000A3. The Hall sensor may recognize a magnetic field generated by the magnet, and may determine whether or not the electronic device 1000 is folded. The magnet and the Hall sensor may be provided to additionally supplement the folding sensing operation using the sensor layer. However, the present disclosure is not limited thereto, and the magnet and the Hall sensor may be omitted as need or desired.

Figure 2:
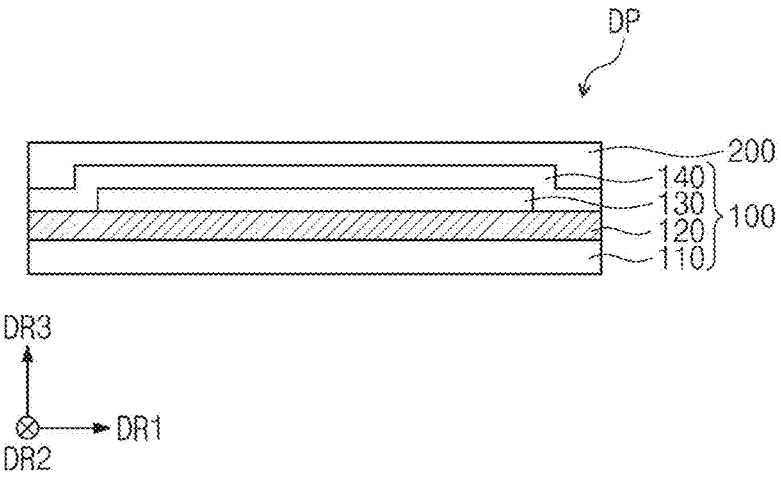
FIG. 2 is a schematic sectional view of a display panel according to an embodiment of the present disclosure.

FIG. 2 is a schematic sectional view of the display panel DP according to an embodiment of the present disclosure.

Referring to FIG. 2, the display panel DP may include a display layer 100 and a sensor layer 200.

The display layer 100 may be a component that substantially generates an image. The display layer 100 may be an emissive display layer. For example, the display layer 100 may be an organic light emitting display layer, an inorganic light emitting display layer, an organic-inorganic light emitting display layer, a quantum-dot display layer, a micro-LED display layer, or a nano-LED display layer. The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may have a multi-layered structure or a single-layer structure. The base layer 110 may be a glass substrate, a metal substrate, a silicon substrate, or a polymer substrate, but the present disclosure is not particularly limited thereto.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 by a suitable process, such as coating or deposition. The insulating layer, the semiconductor layer, and the conductive layer may be selectively subjected to patterning by performing a photolithography process a plurality of times.

The light emitting element layer 130 may be disposed on the circuit layer 120. The light emitting element layer 130 may include light emitting elements. For example, the light emitting element layer 130 may include an organic luminescent material, an inorganic luminescent material, an organic-inorganic luminescent material, a quantum dot, a quantum rod, a micro LED, or a nano LED.

The encapsulation layer 140 may be disposed on the light emitting element layer 130. The encapsulation layer 140 may protect the light emitting element layer 130 from moisture, oxygen, and foreign matter, such as dust particles.

The sensor layer 200 may be disposed on the display layer 100. The sensor layer 200 may sense an external input applied from the outside. The sensor layer 200 may be an integrated sensor that is continuously formed in a process of manufacturing the display layer 100. As another example, the sensor layer 200 may be an external sensor attached to the display layer 100. The sensor layer 200 may be referred to as a sensor, an input sensing layer, an input sensing panel, or an electronic device for sensing input coordinates.

According to an embodiment of the present disclosure, the sensor layer 200 may sense both an input by a passive input or a passive input means, such as a part of the user's body, and an input by an input device that generates a magnetic field having a suitable resonant frequency (e.g., a certain or predetermined resonant frequency). The input device may be referred to as a pen, an input pen, a magnetic pen, a stylus pen, or an electromagnetic resonance pen.

Figure 3:
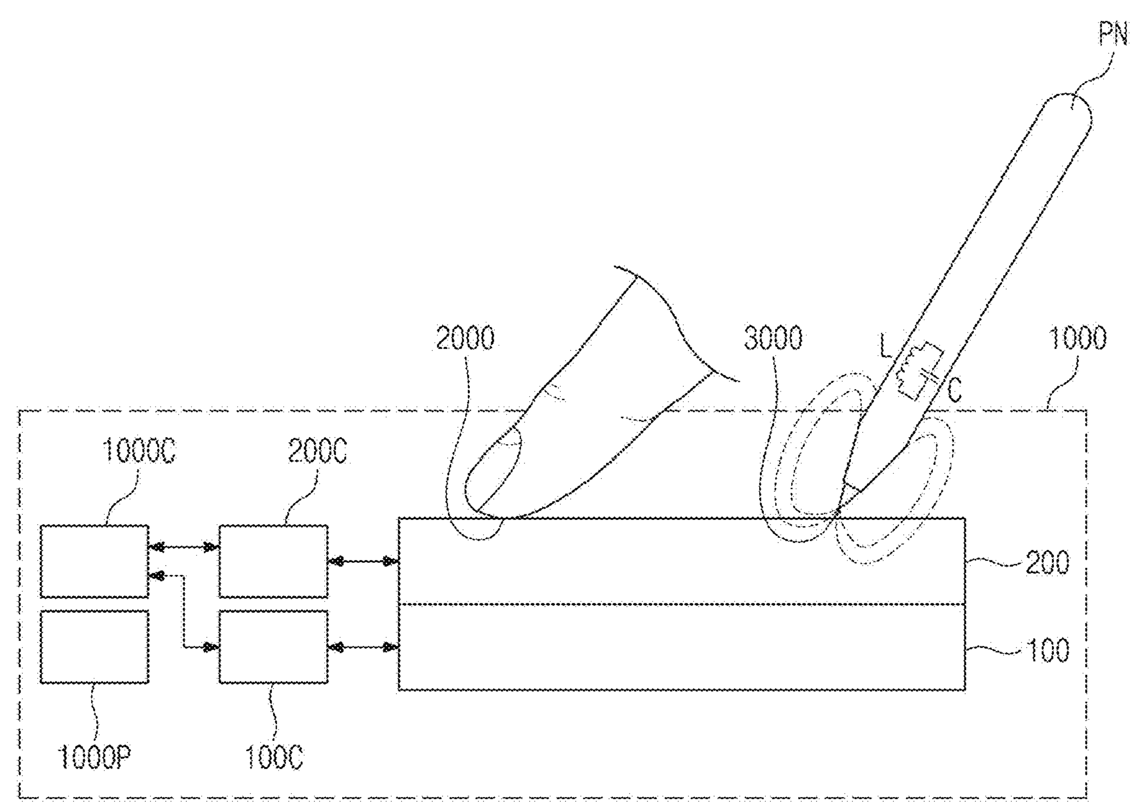
FIG. 3 is a view illustrating an operation of the electronic device according to an embodiment of the present disclosure.

FIG. 3 is a view illustrating an operation of the electronic device 1000 according to an embodiment of the present disclosure.

Referring to FIG. 3, the electronic device 1000 may include the display layer 100, the sensor layer 200, a display driver 100C, a sensor driver 200C, a main driver 1000C, and a power circuit 1000P.

The sensor layer 200 may sense a first input 2000 or a second input 3000 applied from the outside. The first input 2000 and the second input 3000 may be an input by an input means capable of providing a change in a capacitance of the sensor layer 200, or an input by an input means capable of causing an induced current in the sensor layer 200. For example, the first input 2000 may be an input by a passive input means, such as a part of the user's body. The second input 3000 may be an input by the pen PN or an input by an RFIC tag. For example, the pen PN may be a pen of a passive kind or a pen of an active kind.

In an embodiment of the present disclosure, the pen PN may be a device that generates a magnetic field having a suitable resonant frequency (e.g., a certain or predetermined resonant frequency). The pen PN may transmit an output signal based on an electromagnetic resonance scheme. The pen PN may be referred to as an input device, an input pen, a magnetic pen, a stylus pen, or an electromagnetic resonance pen.

The pen PN may include an RLC resonance circuit, and the RLC resonance circuit may include an inductor L and a capacitor C. In an embodiment of the present disclosure, the RLC resonance circuit may be a variable resonance circuit that varies the resonant frequency. In this case, the inductor L may be a variable inductor, and/or the capacitor C may be a variable capacitor. However, the present disclosure is not particularly limited thereto.

The inductor L generates a current by a magnetic field formed in the electronic device 1000, for example, such as in the sensor layer 200. However, the present disclosure is not particularly limited thereto. For example, when the pen PN operates in as active kind, the pen PN may generate a current even though a magnetic field is not provided to the pen PN from the outside. The generated current is transferred to the capacitor C. The capacitor C charges the current input from the inductor L, and discharges the charged current to the inductor L. Thereafter, the inductor L may emit a magnetic field having a resonant frequency. An induced current may flow in the sensor layer 200 by the magnetic field emitted from the pen PN. The induced current may be transferred to the sensor driver 200C as a reception signal (e.g., a sensing signal or a signal).

The main driver 1000C may control the overall operations of the electronic device 1000. For example, the main driver 1000C may control operations of the display driver 100C and the sensor driver 200C. The main driver 1000C may include at least one microprocessor, and may further include a graphics controller. The main driver 1000C may be referred to as an application processor, a central processing unit, or a main processor.

The display driver 100C may drive the display layer 100. The display driver 100C may receive image data and a control signal from the main driver 1000C. The control signal may include various suitable signals. For example, the control signal may include an input vertical synchronization signal, an input horizontal synchronization signal, a main clock signal, and a data enable signal.

The sensor driver 200C may drive the sensor layer 200. The sensor driver 200C may receive a control signal from the main driver 1000C. The control signal may include a clock signal of the sensor driver 200C. In addition, the control signal may further include a mode determination signal for determining a driving mode of the sensor driver 200C and the sensor layer 200.

The sensor driver 200C may be implemented with an integrated circuit (IC), and may be electrically connected with the sensor layer 200. For example, the sensor driver 200C may be directly mounted on a suitable area (e.g., a certain or predetermined area) of the display panel. As another example, the sensor driver 200C may be mounted on a separate printed circuit board using a chip on film (COF) method, and may be electrically connected with the sensor layer 200.

The sensor driver 200C and the sensor layer 200 may selectively operate in a first mode, a second mode, or a third mode. For example, the first mode may be a mode for sensing a touch input, for example, such as the first input 2000. The second mode may be a mode for sensing an input by the pen PN, for example, such as the second input 3000. The third mode may be a mode for sensing whether or not the sensor layer 200 is folded, or for sensing the folding angle of the sensor layer 200. The first mode may be referred to as a touch sensing mode, the second mode may be referred to as a pen sensing mode, and the third mode may be referred to as a folding sensing mode.

Switching between the first mode and the second mode may be performed in various suitable ways. For example, the sensor driver 200C and the sensor layer 200 may be driven in the first mode and the second mode in a time-division manner, and may sense the first input 2000 and the second input 3000. As another example, the switching between the first mode and the second mode may be performed by the user's selection or the user's specific action (e.g., the user's input). As another example, by activation or deactivation of a specific application, one of the first mode or the second mode may be activated or deactivated, or the driving mode may be switched from one mode to the other mode. As another example, while the sensor driver 200C and the sensor layer 200 alternately operate in the first mode and the second mode, when the first input 2000 is sensed, the sensor driver 200C and the sensor layer 200 may remain in the first mode, and when the second input 3000 is sensed, the sensor driver 200C and the sensor layer 200 may remain in the second mode.

The third mode may be repeated every suitable period (e.g., every predetermined period). For example, the frequency of an operation of sensing whether or not the sensor layer 200 is folded, or the degree of which the sensor layer 200 is folded, may be lower than the frequency of an operation of sensing the first input 2000 or the second input 3000. Accordingly, the operation period of the third mode may be greater than or equal to the operation period of the first mode and the operation period of the second mode. The third mode may be operated every suitable period (e.g., every predetermined period). For example, the period may be 1/60 second or more. However, the present disclosure is not particularly limited thereto.

In an embodiment of the present disclosure, the operation period of the third mode may vary depending on states of the electronic device 1000. For example, the electronic device 1000 may operate in a power saving mode when the electronic device 1000 is in the folded state. In this case, the sensor layer 200 may operate in a monitoring mode for monitoring a time point when the electronic device 1000 is unfolded. For example, in the monitoring mode, the operation period of the third mode may be several seconds or more, but the present disclosure is not particularly limited thereto.

The sensor driver 200C may calculate coordinate information of an input based on a signal received from the sensor layer 200, and may provide a coordinate signal having the coordinate information to the main driver 1000C. The main driver 1000C executes an operation corresponding to the user input, based on the coordinate signal. For example, the main driver 1000C may operate the display driver 100C, such that a new application image is displayed on the display layer 100.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a gate high-voltage, a gate low-voltage, a first driving voltage (e.g., an ELVSS voltage), a second driving voltage (e.g., an ELVDD voltage), an initialization voltage, and the like, but the present disclosure is not particularly limited thereto.

Figure 4A:
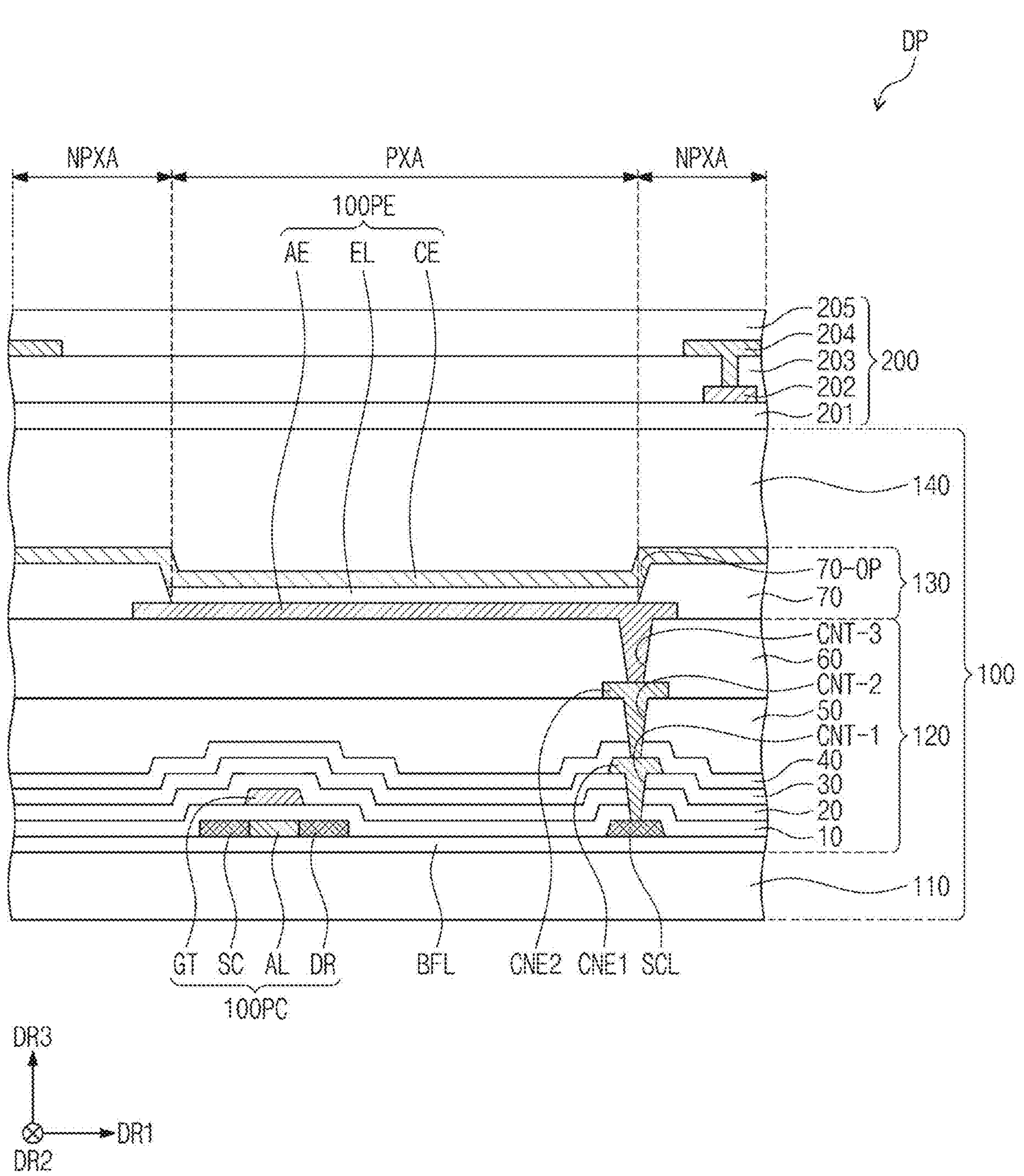
FIG. 4A is a sectional view of the display panel according to an embodiment of the present disclosure.

FIG. 4A is a sectional view of the display panel DP according to an embodiment of the present disclosure.

Referring to FIG. 4A, at least one buffer layer BFL may be formed on the upper surface of the base layer 110. The buffer layer BFL may improve a coupling force between the base layer 110 and a semiconductor pattern. The buffer layer BFL may be formed of multiple layers. As another example, the display layer 100 may further include a barrier layer. The buffer layer BFL may include at least one of silicon oxide, silicon nitride, or silicon oxy nitride. For example, the buffer layer BFL may include a structure in which silicon oxide layers and silicon nitride layers are alternately stacked one above another.

The semiconductor pattern SC, AL, DR, and SCL may be disposed on the buffer layer BFL. The semiconductor pattern SC, AL, DR, and SCL may include poly silicon. However, the present disclosure is not limited thereto, and the semiconductor pattern SC, AL, DR, and SCL may include amorphous silicon, a low-temperature polycrystalline silicon, or an oxide semiconductor.

FIG. 4A illustrates a portion of the semiconductor pattern SC, AL, DR, and SCL, and the semiconductor pattern may be additionally disposed in other areas in another view. The semiconductor pattern SC, AL, DR, and SCL may be arranged according to a suitable rule (e.g., a specific or predetermined rule) across the pixels. The semiconductor pattern SC, AL, DR, and SCL may have different electrical properties depending on whether doping is performed or not. The semiconductor pattern SC, AL, DR, and SCL may include first areas SC, DR, and SCL having a higher conductivity, and a second area AL having a lower conductivity. The first areas SC, DR, and SCL may be doped with an N-type dopant or a P-type dopant. A P-type transistor may include a doped area that is doped with a P-type dopant, and an N-type transistor may include a doped area that is doped with an N-type dopant. The second area AL may be a non-doped area, or may be an area that is more lightly doped than the first areas SC, DR, and SCL.

The first areas SC, DR, and SCL may have a higher conductivity than that of the second area AL, and may substantially serve as electrodes or signal lines. The second area AL may substantially correspond to an active area AL (e.g., a channel) of a transistor 100PC. In other words, one portion AL of the semiconductor pattern SC, AL, DR, and SCL may be the active area AL of the transistor 100PC, another portion SC or DR may be a source area SC or a drain area DR of the transistor 100PC, and another portion SCL may be a connecting electrode or a connecting signal line SCL.

Each of the pixels may have an equivalent circuit including a plurality of transistors, one capacitor, and at least one light emitting element. However, the present disclosure is not necessarily limited thereto, and the equivalent circuit of the pixel may be variously modified as needed or desired. In FIG. 4A, one transistor 100PC and one light emitting element 100PE that are included in the pixel are illustrated.

The source area SC, the active area AL, and the drain area DR of the transistor 100PC may be formed from the semiconductor pattern SC, AL, DR, and SCL. The source area SC and the drain area DR may extend from the active area AL in opposite directions from each other on the section (e.g., in a cross-sectional view). In FIG. 4A, a portion of the connecting signal line SCL formed from the semiconductor pattern SC, AL, DR, and SCL is illustrated for convenience. In another view, the connecting signal line SCL may be connected to the drain area DR of the transistor 100PC when viewed from above the plane (e.g., in a plan view).

A first insulating layer 10 may be disposed on the buffer layer BFL. The first insulating layer 10 may commonly overlap with the plurality of pixels, and may cover the semiconductor pattern SC, AL, DR, and SCL. The first insulating layer 10 may be an inorganic layer and/or an organic layer, and may have a single-layer structure or a multi-layered structure. The first insulating layer 10 may include at least one of aluminum oxide, titanium oxide, silicon oxide, silicon nitride, silicon oxy nitride, zirconium oxide, or hafnium oxide. In the present embodiment, the first insulating layer 10 may be a single silicon oxide layer. Not only the first insulating layer 10, but also insulating layers of the circuit layer 120 that will be described in more detail below, may be inorganic layers and/or organic layers, and may have a single-layer structure or a multi-layered structure. The inorganic layers may include at least one of the aforementioned inorganic materials, but the present disclosure is not limited thereto.

A gate GT of the transistor 100PC is disposed on the first insulating layer 10. The gate GT may be a portion of a metal pattern. The gate GT overlaps with the active area AL. The gate GT may function as a mask in a process of doping or reducing the semiconductor pattern SC, AL, DR, and SCL.

A second insulating layer 20 may be disposed on the first insulating layer 10, and may cover the gate GT. The second insulating layer 20 may commonly overlap with the pixels. The second insulating layer 20 may be an inorganic layer and/or an organic layer, and may have a single-layer structure or a multi-layered structure. The second insulating layer 20 may include at least one of silicon oxide, silicon nitride, or silicon oxy nitride. In the present embodiment, the second insulating layer 20 may have a multi-layered structure including a silicon oxide layer and a silicon nitride layer.

A third insulating layer 30 may be disposed on the second insulating layer 20. The third insulating layer 30 may have a single-layer structure or a multi-layered structure. For example, the third insulating layer 30 may have a multi-layered structure including a silicon oxide layer and a silicon nitride layer.

A first connecting electrode CNE1 may be disposed on the third insulating layer 30. The first connecting electrode CNE1 may be connected to the connecting signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connecting electrode CNE2 may be disposed on the fifth insulating layer 50. The second connecting electrode CNE2 may be connected to the first connecting electrode CNE1 through a contact hole CNT-2 penetrating the fourth insulating layer 40 and the fifth insulating layer 50.

A sixth insulating layer 60 may be disposed on the fifth insulating layer 50, and may cover the second connecting electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic luminescent material, an inorganic luminescent material, an organic-inorganic luminescent material, a quantum dot, a quantum rod, a micro LED, or a nano LED. Hereinafter, for convenience of illustration, the light emitting element 100PE may be described in more detail in the context of an organic light emitting element. However, the present disclosure is not particularly limited thereto.

The light emitting element 100PE may include a first electrode AE, an emissive layer EL, and a second electrode CE.

The first electrode AE may be disposed on the sixth insulating layer 60. The first electrode AE may be connected to the second connecting electrode CNE2 through a contact hole CNT-3 penetrating the sixth insulating layer 60.

A pixel defining layer 70 may be disposed on the sixth insulating layer 60, and may cover a portion of the first electrode AE. The pixel defining layer 70 has an opening 70-OP defined therein. The opening 70-OP of the pixel defining layer 70 exposes at least a portion of the first electrode AE.

The active area 1000A (e.g., refer to FIG. 1A) may include an emissive area PXA, and a non-emissive area NPXA adjacent to the emissive area PXA. The non-emissive area NPXA may surround (e.g., around a periphery of) the emissive area PXA. In the present embodiment, the emissive area PXA is defined to correspond to a partial region of the first electrode AE exposed by the opening 70-OP.

The emissive layer EL may be disposed on the first electrode AE. The emissive layer EL may be disposed in an area corresponding to the opening 70-OP. Although FIG. 4A illustrates an example in which the emissive layer EL is disposed in the opening 70-OP, the present disclosure is not particularly limited thereto. For example, the emissive layer EL may extend to cover the side surface of the pixel defining layer 70 that defines the opening 70-OP, and a portion of the upper surface of the pixel defining layer 70.

In an embodiment of the present disclosure, the emissive layer EML may be separately formed for each of the pixels. When the emissive layer EL is separately formed for each of the pixels, the emissive layers EL may each emit at least one of a blue light, a red light, or a green light. However, the present disclosure is not limited thereto, and the emissive layer EL may have a one-body shape to be commonly included in the plurality of pixels. In this case, the emissive layer EL may provide a blue light or a white light.

The second electrode CE may be disposed on the emissive layer EL. The second electrode CE may have a one-body shape, and may be commonly included in the plurality of pixels.

In an embodiment of the present disclosure, a hole control layer may be disposed between the first electrode AE and the emissive layer EL. The hole control layer may be commonly disposed in the emissive area PXA and the non-emissive area NPXA. The hole control layer may include a hole transport layer, and may further selectively include a hole injection layer. An electron control layer may be disposed between the emissive layer EL and the second electrode CE. The electron control layer may include an electron transport layer, and may further selectively include an electron injection layer. The hole control layer and the electron control layer may be commonly formed in the plurality of pixels using an open mask or an ink-jet process.

The encapsulation layer 140 may be disposed on the light emitting element layer 130. The encapsulation layer 140 may include an inorganic layer, an organic layer, and an inorganic layer that are sequentially stacked one above another. However, the layers constituting the encapsulation layer 140 are not limited thereto. The inorganic layers may protect the light emitting element layer 130 from moisture and oxygen, and the organic layer may protect the light emitting element layer 130 from foreign matter, such as dust particles. The inorganic layers may include a silicon nitride layer, a silicon oxy nitride layer, a silicon oxide layer, a titanium oxide layer, or an aluminum oxide layer. The organic layer may include an acrylic organic layer, but the present disclosure is not limited thereto.

The sensor layer 200 may include a base layer 201, a first conductive layer 202, an intermediate insulating layer 203, a second conductive layer 204, and a cover insulating layer 205.

The base layer 201 may be an inorganic layer including at least one of silicon nitride, silicon oxy nitride, or silicon oxide. As another example, the base layer 201 may be an organic layer including an epoxy resin, an acrylic resin, or an imide-based resin. The base layer 201 may have a single-layer structure, or may have a multi-layered structure stacked in the third direction DR3. In an embodiment of the present disclosure, the sensor layer 200 may not include the base layer 201.

Each of the first conductive layer 202 and the second conductive layer 204 may have a single-layer structure, or may have a multi-layered structure stacked in the third direction DR3.

Each of the first conductive layer 202 and the second conductive layer 204 that have the single-layer structure may include a metal layer or a transparent conductive layer. The metal layer may include molybdenum, silver, titanium, copper, aluminum, or a suitable alloy thereof. The transparent conductive layer may include a transparent conductive oxide, such as indium tin oxide (ITO), indium zinc oxide (IZO), zinc oxide (ZnO), indium zinc tin oxide (IZTO), or the like. In addition, the transparent conductive layer may include a conductive polymer, such as poly(3,4-ethylenedioxythiophene) (PEDOT), a metal nano wire, or graphene.

Each of the first conductive layer 202 and the second conductive layer 204 that have the multi-layered structure may include a plurality of metal layers. The meal layers may have, for example, a three-layered structure of titanium/aluminum/titanium. The conductive layers having the multi-layered structure may include at least one metal layer and at least one transparent conductive layer.

In an embodiment of the present disclosure, the thickness of the first conductive layer 202 may be greater than or equal to the thickness of the second conductive layer 204. When the thickness of the first conductive layer 202 is greater than the thickness of the second conductive layer 204, a resistance of a component (e.g., an electrode, a pattern, or a bridge pattern) included in the first conductive layer 202 may be decreased. In addition, because the first conductive layer 202 may be disposed under the second conductive layer 204, a probability that components included in the first conductive layer 202 will be visually recognized due to a reflection of external light may be lower than that of the second conductive layer 204, even though the thickness of the first conductive layer 202 is increased.

At least one of the intermediate insulating layer 203 or the cover insulating layer 205 may include an inorganic film. The inorganic film may include at least one of aluminum oxide, titanium oxide, silicon oxide, silicon nitride, silicon oxy nitride, zirconium oxide, or hafnium oxide.

At least one of the intermediate insulating layer 203 or the cover insulating layer 205 may include an organic film. The organic film may include at least one of an acrylic resin, a methacrylic resin, a polyisoprene resin, a vinyl resin, an epoxy resin, a urethane-based resin, a celluosic resin, a siloxane-based resin, a polyimide resin, a polyamide resin, or a perylene-based resin.

Although the sensor layer 200 may include the first conductive layer 202 and the second conductive layer 204 as described above, or in other words, a total of two conductive layers, the present disclosure is not particularly limited thereto. For example, the sensor layer 200 may include three or more conductive layers.

Figure 4B:
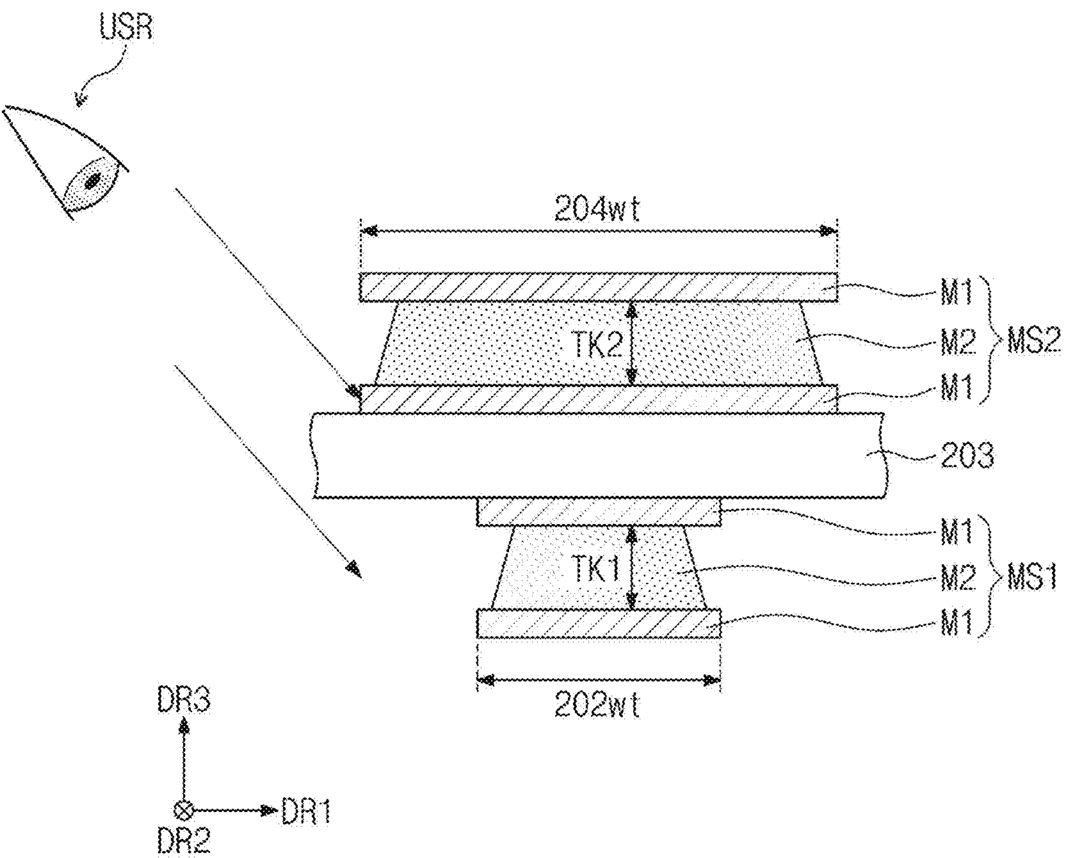
FIG. 4B is a sectional view of a sensor layer according to an embodiment of the present disclosure.

FIG. 4B is a sectional view of the sensor layer 200 according to an embodiment of the present disclosure.

Referring to FIGS. 4A and 4B, a second width 204*wt* of a second mesh line MS2 included in the second conductive layer 204 may be greater than or equal to a first width 202*wt* of a first mesh line MS1 included in the first conductive layer 202. When a user USR looks at the first mesh line MS1 and the second mesh line MS2 from the side, a probability that the first mesh line MS1 will be visually recognized by the user USR may be decreased, because the first mesh line MS1 has a smaller width than the second mesh line MS2.

Each of the first mesh line MS1 and the second mesh line MS2 may include first metal layers M1, and a second metal layer M2 disposed between the first metal layers M1. For example, the first metal layers M1 may include titanium (Ti), and the second metal layer M2 may include aluminum (Al). However, the present disclosure is not particularly limited thereto.

In an embodiment of the present disclosure, a first thickness TK1 of the second metal layer M2 of the first mesh line MS1 and a second thickness TK2 of the second metal layer M2 of the second mesh line MS2 may be the same or substantially the same as each other, but the present disclosure is not particularly limited thereto. For example, the first thickness TK1 may be greater than the second thickness TK2. As another example, the second thickness TK2 may be greater than the first thickness TK1. In an embodiment of the present disclosure, each of the first thickness TK1 and the second thickness TK2 may be 1000 angstroms or more, for example, such as 6000 angstroms.

Figure 5:
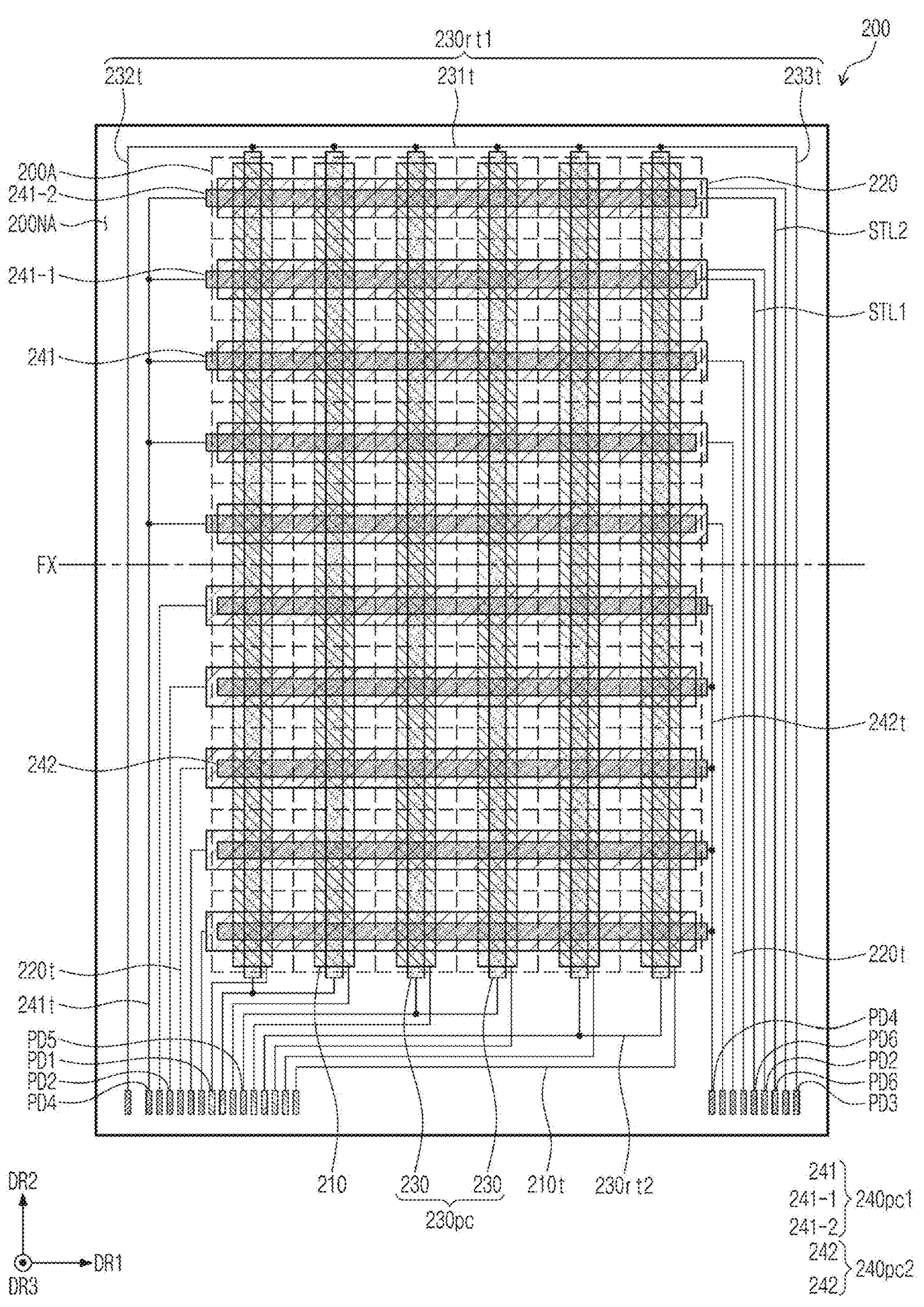
FIG. 5 is a plan view of the sensor layer according to an embodiment of the present disclosure.

FIG. 5 is a plan view of the sensor layer 200 according to an embodiment of the present disclosure.

Referring to FIG. 5, the sensor layer 200 may be folded and unfolded about the folding axis FX extending in the first direction DR1. A sensing area 200A and a peripheral area 200NA adjacent to the sensing area 200A may be defined in the sensor layer 200.

The sensor layer 200 may include a plurality of first electrodes 210, a plurality of second electrodes 220, a plurality of charging electrode groups 230*pc*, a first electrode group 240*pc*1, and a second electrode group 240*pc*2 disposed in the sensing area 200A.

Each of the first electrodes 210 may cross the second electrodes 220. The first electrode 210 may extend in the second direction DR2. The first electrodes 210 may be arranged along the first direction DR1 so as to be spaced apart from one another. Each of the second electrodes 220 may extend in the first direction DR1. The second electrodes 220 may be arranged along the second direction DR2 so as to be spaced apart from one another. A sensing unit (e.g., a sensing area) SU of the sensor layer 200 may be an area where one first electrode 210 and one second electrode 220 cross each other.

Although six first electrodes 210, ten second electrodes 220, and sixty sensing units SU are illustrated in FIG. 5 for convenience of illustration, the number of first electrodes 210 and the number of second electrodes 220 are not limited thereto.

Each of the plurality of charging electrode groups 230*pc* may include one or more charging electrodes 230. Each of the charging electrodes 230 may extend in the second direction DR2. The charging electrodes 230 may be arranged along the first direction DR1 so as to be spaced apart from one another. One charging electrode 230 may at least partially overlap with one first electrode 210. According to an embodiment of the present disclosure, a capacitance (e.g., a coupling capacitance) between one first electrode 210 and one charging electrode 230 may be adjusted by adjusting an overlapping area between the one first electrode 210 and the one charging electrode 230.

In an embodiment of the present disclosure, at least some of the charging electrodes 230 may be connected in parallel with each other. FIG. 5 illustrates an example in which two charging electrodes 230 are connected in parallel with each other to form one charging electrode group 230*pc*, and three charging electrode groups 230*pc* may be arranged along the first direction DR1. However, the number of charging electrodes 230 constituting the charging electrode group 230*pc* is not limited thereto. For example, one charging electrode group 230*pc* may include only one charging electrode 230, or may include three or more charging electrodes 230.

As the number of charging electrodes 230 included in the charging electrode group 230*pc* that are connected in parallel with each other is increased, a resistance of the charging electrode group 230*pc* may be lowered, and thus, a power efficiency and a sensing sensitivity may be improved. On the other hand, as the number of charging electrodes 230 included in the charging electrode group 230*pc* is decreased, a loop coil pattern formed using the charging electrode group 230*pc* may be implemented in more various desired forms.

The first electrode group 240*pc*1 and the second electrode group 240*pc*2 may be spaced apart from each other in the second direction DR2. For example, the first electrode group 240*pc*1 and the second electrode group 240*pc*2 may be spaced apart from each other with the folding axis FX therebetween.

The first electrode group 240*pc*1 may include a plurality of first auxiliary electrodes 241, 241-1, and 241-2 arranged along the second direction DR2, and the second electrode group 240*pc*2 may include a plurality of second auxiliary electrodes 242 arranged along the second direction DR2. Each of the first auxiliary electrodes 241, 241-1, and 241-2 may extend in the first direction DR1, and each of the second auxiliary electrodes 242 may extend in the first direction DR1.

Although FIG. 5 illustrates an example in which the first electrode group 240*pc*1 includes a total of five first auxiliary electrodes 241, 241-1, and 241-2, and the second electrode group 240*pc*2 includes a total of five second auxiliary electrodes 242, the present disclosure is not particularly limited thereto. For example, more first auxiliary electrodes may be included in the first electrode group 240*pc*1, and more second auxiliary electrodes may be included in the second electrode group 240*pc*2.

Among the first auxiliary electrodes 241, 241-1, and 241-2 and the second auxiliary electrodes 242, one auxiliary electrode may at least partially overlap with one second electrode 220. According to an embodiment of the present disclosure, a capacitance (e.g., a coupling capacitance) between one second electrode 220 and one auxiliary electrode may be adjusted by adjusting an overlapping area between the one second electrode 220 and the one auxiliary electrode.

The sensor layer 200 may further include a plurality of first trace lines 210*t* disposed in the peripheral area 200NA, a plurality of first pads PD1 connected to the first trace lines 210*t* in a one-to-one correspondence, a plurality of second trace lines 220*t*, and a plurality of second pads PD2 connected to the second trace lines 220*t* in a one-to-one correspondence. The first trace lines 210*t* may be electrically connected to the first electrodes 210 in a one-to-one correspondence. The second trace lines 220*t* may be electrically connected to the second electrodes 220 in a one-to-one correspondence.

The sensor layer 200 may further include a first loop trace line 230*rt*1 disposed in the peripheral area 200NA, a plurality of third pads PD3 connected to one end and an opposite end of the first loop trace line 230*rt*1, auxiliary trace lines 241*t* and 242*t*, fourth pads PD4 connected to the auxiliary trace lines 241*t* and 242*t* in a one-to-one correspondence, second loop trace lines 230*rt*2, fifth pads PD5 connected to the second loop trace lines 230*rt*2 in a one-to-one correspondence, signal transmission lines STL1 and STL2, and sixth pads PD6 connected to the signal transmission lines STL1 and STL2 in a one-to-one correspondence.

The first loop trace line 230*rt*1 may be electrically connected with the charging electrodes 230. In an embodiment of the present disclosure, the first loop trace line 230*rt*1 may be electrically connected with all of the charging electrodes 230. The first loop trace line 230*rt*1 may include a first line portion 231*t* that extends in the first direction DR1 and that is electrically connected to the charging electrodes 230, a second line portion 232*t* extending from a first end of the first line portion 231*t* in the second direction DR2, and a third line portion 233*t* extending from a second end of the first line portion 231*t* in the second direction DR2.

In an embodiment of the present disclosure, each of a resistance of the second line portion 232*t* and a resistance of the third line portion 233*t* may be the same or substantially the same as the resistance of one charging electrode among the charging electrodes 230. Accordingly, the second line portion 232*t* and the third line portion 233*t* may serve as the charging electrodes 230, and the same or substantially the same effect as placing the charging electrodes 230 in the peripheral area 200NA may be obtained. For example, one of the second line portion 232*t* or the third line portion 233*t* and one of the charging electrodes 230 may form a coil. Accordingly, the pen PN located in an area adjacent to the peripheral area 200NA may also be sufficiently charged by a loop including the second line portion 232*t* or the third line portion 233*t*.

In an embodiment of the present disclosure, widths of the second line portion 232*t* and the third line portion 233*t* in the first direction DR1 may be adjusted to adjust the resistance of the second line portion 232*t* and the resistance of the third line portion 233*t*. However, the present disclosure is not limited thereto, and the first to third line portions 231*t*, 232*t*, and 233*t* may have the same or substantially the same width as each other.

The second loop trace lines 230*rt*2 may be connected to the charging electrode groups 230*pc* in a one-to-one correspondence. In other words, the number of second loop trace lines 230*rt*2 may correspond to the number of charging electrode groups 230*pc*. In FIG. 5, three second loop trace lines 230*rt*2 and three charging electrode groups 230*pc* are illustrated as an example.

In an embodiment of the present disclosure, the second loop trace lines 230*t*2 and the fifth pads PD5 may be omitted, and a charging driving mode for charging the pen may be omitted. In this case, the sensor layer 200 may sense an input by an active pen capable of emitting a magnetic field, even though a magnetic field is not provided from the sensor layer 200.

The auxiliary trace lines 241*t* and 242*t* may be spaced apart from each other with the sensing area 200A therebetween. The auxiliary trace lines 241*t* and 242*t* may include a first auxiliary trace line 241*t* electrically connected to the first electrode group 240*pc*1, and a second auxiliary trace line 242*t* electrically connected to the second electrode group 240*pc*2. The first auxiliary trace line 241*t* may be electrically connected with all of the first auxiliary electrodes 241, 241-1, and 241-2, and the second auxiliary trace line 242*t* may be electrically connected with all of the second auxiliary electrodes 242.

In an embodiment of the present disclosure, folding of the electronic device 1000 (e.g., refer to FIG. 1A) may be sensed using at least two auxiliary electrodes included in the first electrode group 240*pc*1 or the second electrode group 240*pc*2. Hereinafter, for convenience of illustration, a magnetic field for folding sensing formed using the first electrode group 240*pc*1 may be described in more detail. However, the present disclosure is not particularly limited thereto. For example, a magnetic field for folding sensing may be formed using the second electrode group 240*pc*2.

According to an embodiment of the present disclosure, the signal transmission lines STL1 and STL2 may include a first signal transmission line STL1 and a second signal transmission line STL2 that are spaced apart from the first auxiliary trace line 241*t* with the sensing area 200A therebetween.

According to an embodiment of the present disclosure, the first auxiliary electrodes 241, 241-1, and 241-2 may include a first-first auxiliary electrode 241-1, a first-second auxiliary electrode 241-2, and additional first auxiliary electrodes 241. The first-first auxiliary electrode 241-1 may be electrically connected to the first signal transmission line STL1. The first-second auxiliary electrode 241-2 may be electrically connected to the second signal transmission line STL2. First ends of the additional first auxiliary electrodes 241 may be connected to the first auxiliary trace line 241*t*, and second ends of the additional first auxiliary electrodes 241 may be floated. The additional first auxiliary electrodes 241 may be referred to as auxiliary electrodes, or other auxiliary electrodes.

According to an embodiment of the present disclosure, a coil for folding sensing may be provided by the first signal transmission line STL1, the first-first auxiliary electrode 241-1, a portion of the first auxiliary trace line 241*t*, the first-second auxiliary electrode 241-2, and the second signal transmission line STL2. A signal (e.g., a certain or predetermined signal) may be provided to the coil for folding sensing, and a magnetic field may be generated accordingly. In this case, when the sensor layer 200 is folded about the folding axis FX, an induced current induced by the magnetic field may be sensed by at least some of the second electrodes 220, and whether or not the sensor layer 200 is folded, or the degree to which the sensor layer 200 is folded, may be sensed. Thus, a separate module for sensing folding may be omitted, so that manufacturing costs may be reduced. In addition, because the separate module is omitted, a space may be secured.

Figure 6A:
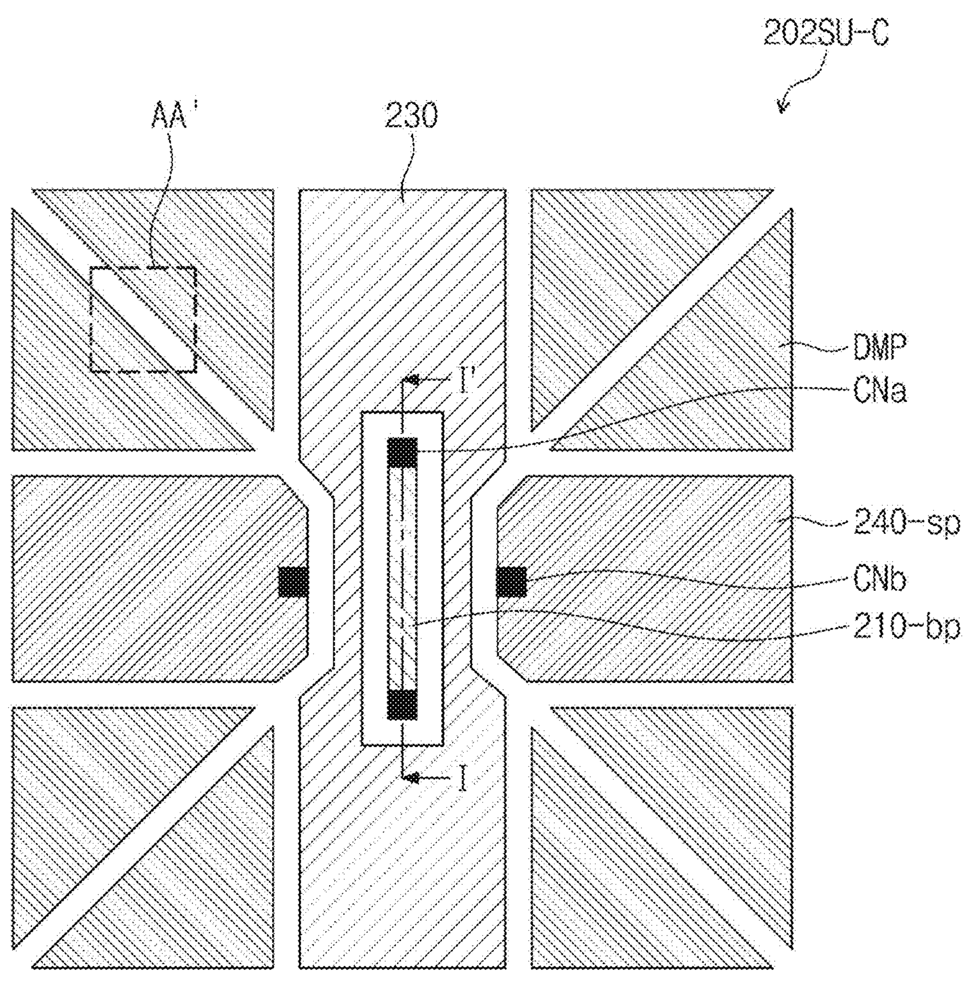
FIG. 6A is a plan view illustrating a first conductive layer of a sensing unit according to an embodiment of the present disclosure.
Figure 6A:
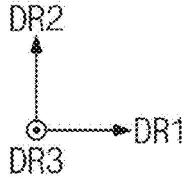
Figure 6B:
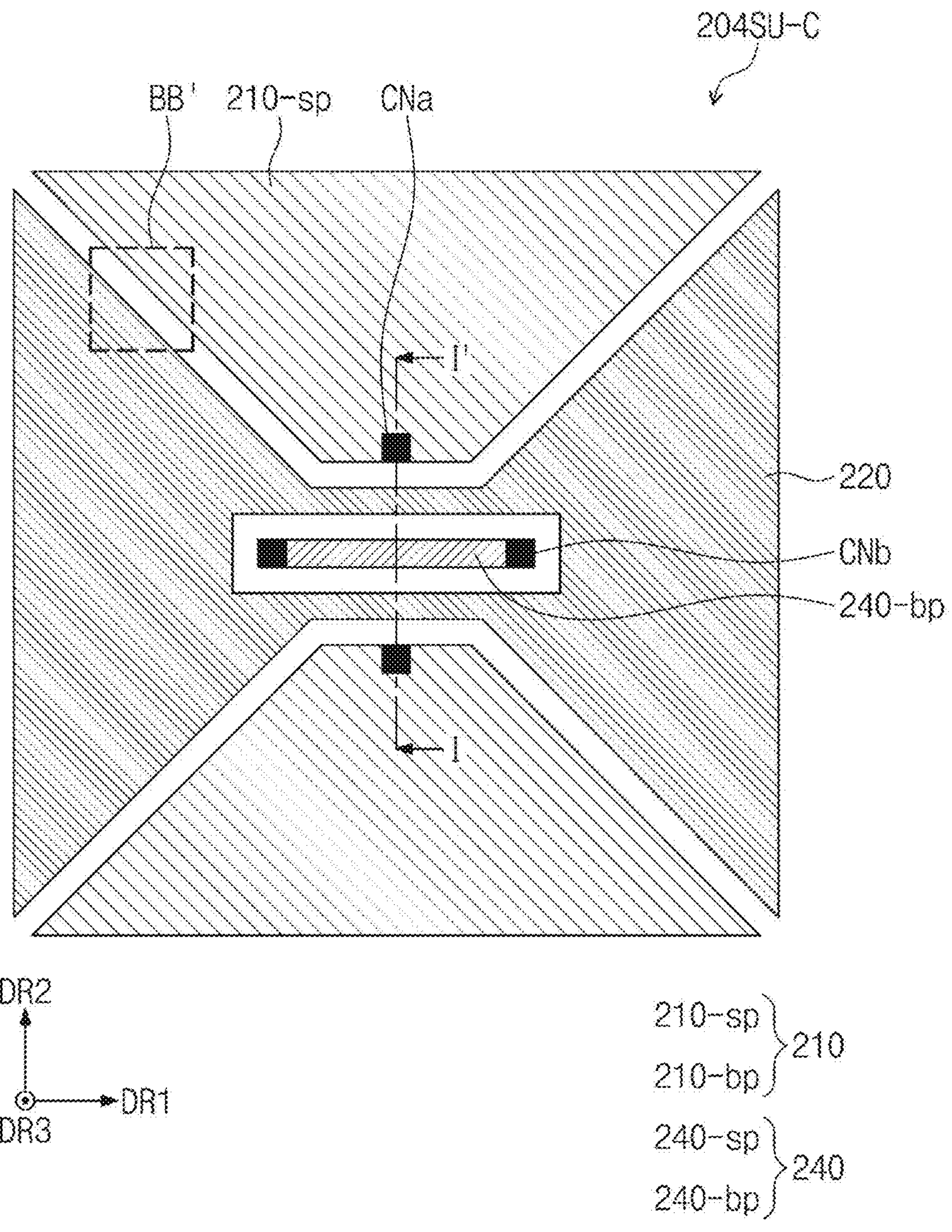
FIG. 6B is a plan view illustrating a second conductive layer of the sensing unit according to an embodiment of the present disclosure.
Figure 7:
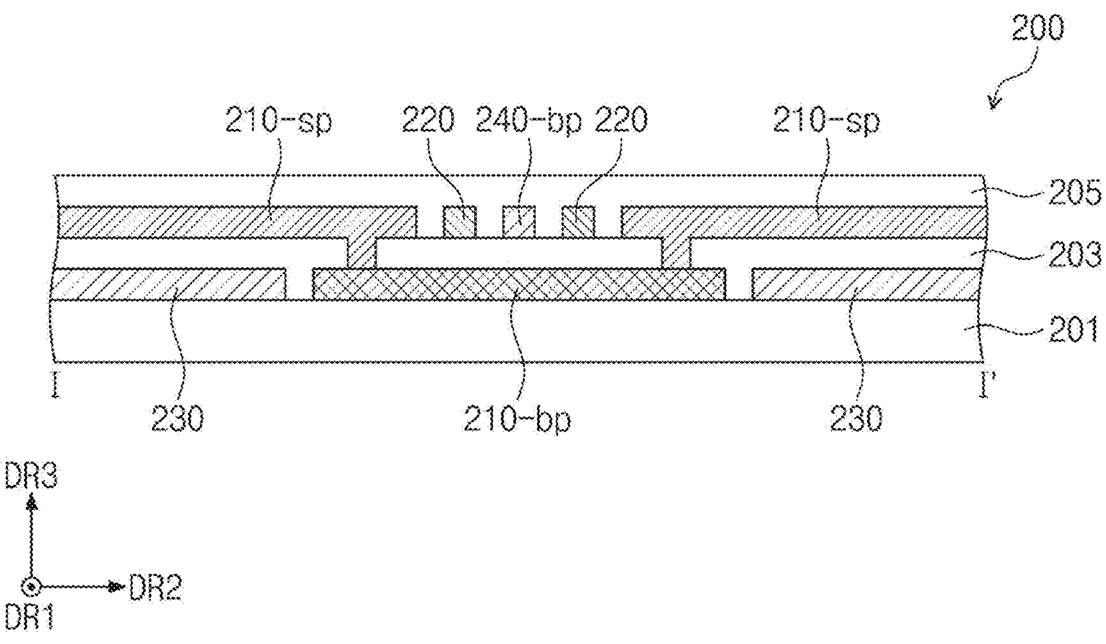
FIG. 7 is a sectional view of the sensor layer taken along the line I-I' of FIGS. 6A and 6B according to an embodiment of the present disclosure.

FIG. 6A is a plan view illustrating a first conductive layer 202SU-C of the sensing unit SU according to an embodiment of the present disclosure. FIG. 6B is a plan view illustrating a second conductive layer 204SU-C of the sensing unit SU according to an embodiment of the present disclosure. FIG. 7 is a sectional view of the sensor layer 200 taken along the line I-I' of FIGS. 6A and 6B according to an embodiment of the present disclosure.

FIGS. 6A and 6B illustrate the shapes of the first conductive layer 202SU-C and the second conductive layer 204SU-C of the sensing unit SU. However, the present disclosure is not limited thereto, and the shapes of the first conductive layer 202SU-C and the second conductive layer 204SU-C may be modified as needed or desired. For example, one sensing unit SU may have a shape in which the shapes illustrated in FIGS. 6A and 6B are arranged in a 3×3 array in the first direction DR1 and the second direction DR2.

Referring to FIGS. 6A, 6B, and 7, the first electrode 210 may include first patterns 210-*sp* and a first bridge pattern 210-*bp*. The first patterns 210-*sp* and the first bridge pattern 210-*bp* may be electrically connected with each other through first contacts CNa. The second electrode 220 may be disposed at (e.g., in or on) the same layer as that of the first patterns 210-*sp*. For example, the first patterns 210-*sp* may be spaced apart from each other with the second electrode 220 therebetween. The first bridge pattern 210-*bp* may be disposed at (e.g., in or on) a layer different from the layer at (e.g., in or on) which the second electrode 220 is disposed. The first bridge pattern 210-*bp* may be insulated from the second electrode 220, and may cross the second electrode 220.

The charging electrode 230 may be disposed at (e.g., in or on) the same layer as that of the first bridge pattern 210-*bp*. An opening may be defined in the charging electrode 230 to surround (e.g., around a periphery of) the first bridge pattern 210-*bp*. The charging electrode 230 may overlap with the first patterns 210-*sp*. Accordingly, a coupling capacitor may be defined between the first electrode 210 and the charging electrode 230.

An auxiliary electrode 240 may correspond to one of the first auxiliary electrodes 241, 241-1, or 241-2 or the second auxiliary electrodes 242 described above with reference to FIG. 5. The auxiliary electrode 240 may include second patterns 240-*sp* and a second bridge pattern 240-*bp*. The second patterns 240-*sp* and the second bridge pattern 240-*bp* may be electrically connected with each other through second contacts CNb. The charging electrode 230 may be disposed at (e.g., in or on) the same layer as that of the second patterns 240-*sp*. For example, the second patterns 240-*sp* may be spaced apart from each other with the charging electrode 230 therebetween. The second bridge pattern 240-*bp* may be disposed at (e.g., in or on) a layer different from the layer at (e.g., in or on) which the charging electrode 230 is disposed. The second bridge pattern 240-*bp* may be insulated from the charging electrode 230, and may cross the charging electrode 230.

In an embodiment of the present disclosure, the first conductive layer 202SU-C may include the first bridge pattern 210-*bp*, the charging electrode 230, and the second patterns 240-*sp*. The second conductive layer 204SU-C may include the first patterns 210-*sp*, the second electrode 220, and the second bridge pattern 240-*bp*.

In an embodiment of the present disclosure, the first conductive layer 202SU-C may further include dummy patterns DMP. Because the dummy patterns DMP may be disposed in empty spaces, a probability that specific patterns will be visually recognized due to a reflection of external light may be reduced. In other words, the electronic device 1000 (e.g., refer to FIG. 1A) having an improved visibility depending on a reflection of external light may be provided. Each of the dummy patterns DMP may be electrically floated or electrically grounded. In an embodiment of the present disclosure, the dummy patterns DMP may be omitted.

Referring to FIGS. 6A and 6B, in the second conductive layer 204SU-C in one sensing unit SU, the area occupied by the components included in the first electrode 210 and the second electrode 220 may be larger than the area occupied by the components included in the charging electrode 230 and the auxiliary electrode 240. A change in a capacitance by the first input 2000 (e.g., refer to FIG. 3) may be increased as the distance is decreased. Accordingly, a component for sensing the first input 2000 (e.g., refer to FIG. 3) may be disposed in a relatively larger area in a layer adjacent to the surface of the electronic device 1000 (e.g., refer to FIG. 1A). Thus, a touch performance may be improved.

Although FIGS. 4A to 7 illustrate a structure in which the first electrode 210, the second electrode 220, the charging electrode 230, and the auxiliary electrode 240 are distributed and arranged in the two conductive layers 202SU-C and 204SU-C, the present disclosure is not particularly limited thereto. For example, the first electrode 210, the second electrode 220, the charging electrode 230, and the auxiliary electrode 240 may be distributed and arranged in three or four conductive layers.

In an embodiment of the present disclosure, the charging electrode 230 to which a signal is applied in the charging driving mode may be included in a third conductive layer disposed under the first and second conductive layers 202SU-C and 204SU-C. For example, the third conductive layer may be provided under the base layer 201. The third conductive layer may be disposed between the base layer 201 and the display layer 100, may be disposed under the display layer 100, or may be included in the display layer 100.

The first electrode 210, the second electrode 220, and the auxiliary electrode 240 may be included in the first and second conductive layers 202SU-C and 204SU-C. For example, when the charging electrode 230 is implemented as a separate conductive layer, such as the third conductive layer, the shape of the charging electrode 230 may be more freely designed. For example, the charging electrode 230 may be provided in a form including a plurality of coils. In addition, the charging electrode 230 may be more densely provided using the third conductive layer, and in this case, a pen sensing sensitivity may be improved. In an embodiment of the present disclosure, the auxiliary electrode 240, instead of the charging electrode 230, may be included in the third conductive layer.

Figure 8A:
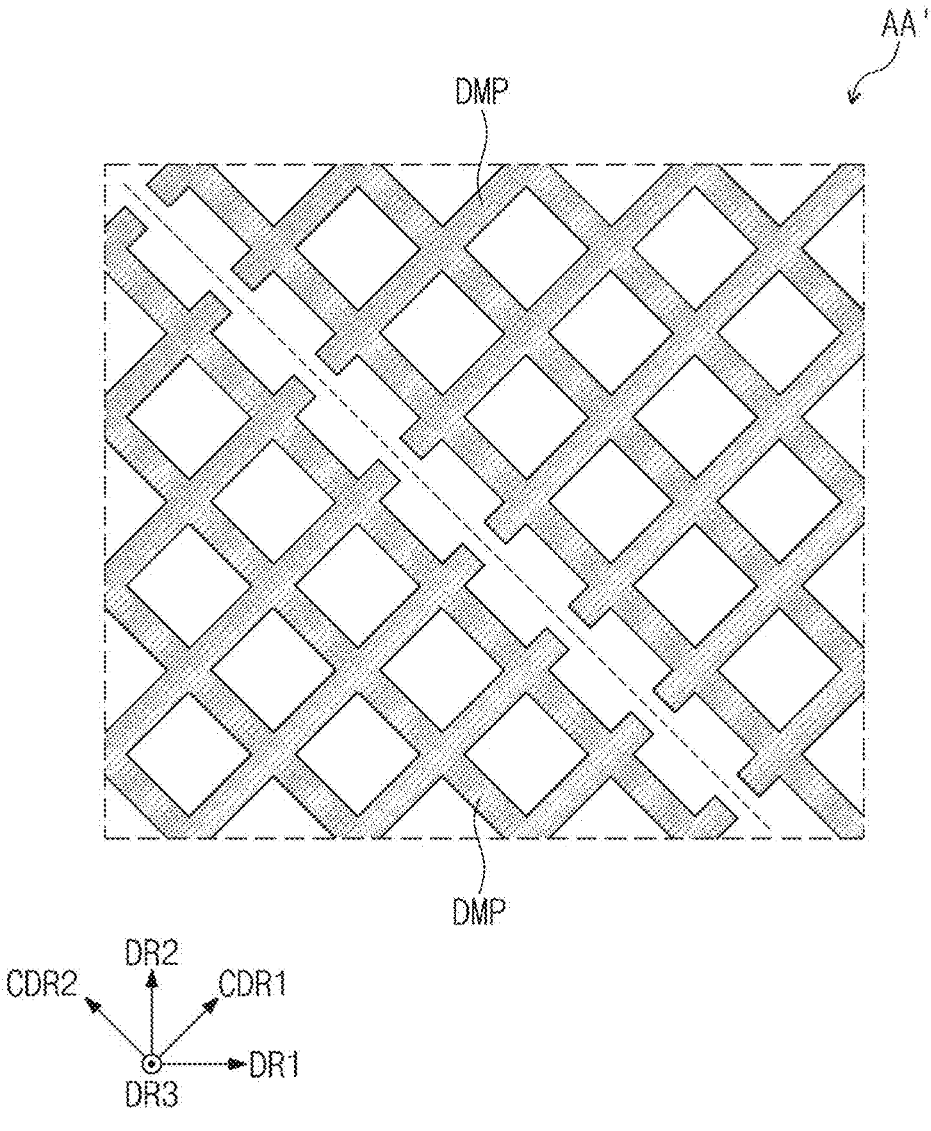
FIG. 8A is an enlarged plan view of the area AA' in FIG. 6A.
Figure 8B:
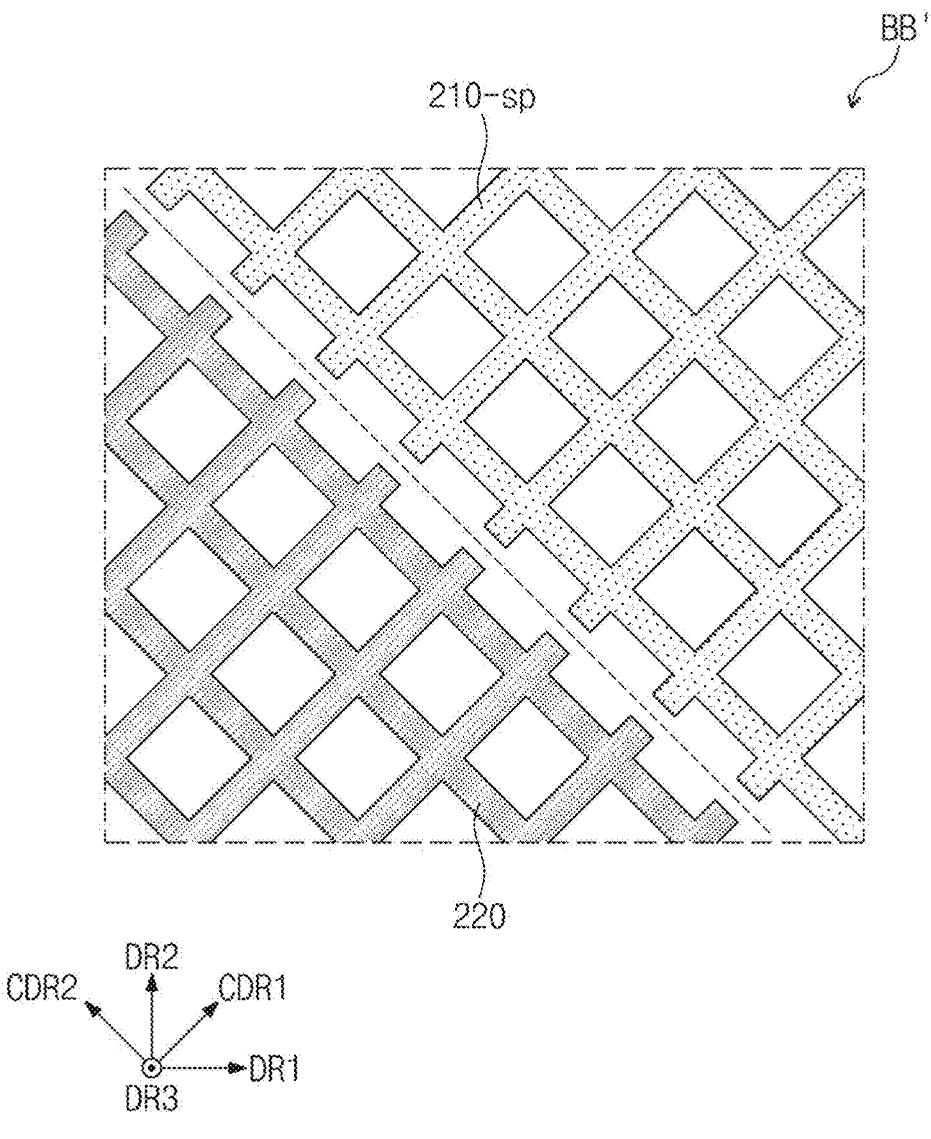
FIG. 8B is an enlarged plan view of the area BB' in FIG. 6B.

FIG. 8A is an enlarged plan view of the area AA' in FIG. 6A. FIG. 8B is an enlarged plan view of the area BB' in FIG. 6B.

Referring to FIGS. 6A, 6B, 8A, and 8B, each of the first electrodes 210, the second electrodes 220, the charging electrodes 230, the auxiliary electrodes 240, and the dummy patterns DMP may have a mesh structure. The mesh structure may include a plurality of mesh lines. Each of the plurality of mesh lines may have a suitable shape extending in a suitable direction (e.g., a certain or predetermined direction). The plurality of mesh lines may be connected with one another. The mesh lines may have various suitable shapes, such as a straight line, a line having protrusions, and/or an uneven line. Openings where a mesh structure is not disposed may be defined (e.g., provided or formed) in each of the first electrodes 210, the second electrodes 220, the charging electrodes 230, the auxiliary electrodes 240, and the dummy patterns DMP.

FIGS. 8A and 8B illustrate an example in which the mesh structure includes mesh lines extending in a first crossing direction CDR1 that crosses the first direction DR1 and the second direction DR2, and mesh lines extending in a second crossing direction CDR2 that crosses the first crossing direction CDR1. However, the extension directions of the mesh lines constituting the mesh structure are not particularly limited to those illustrated in FIGS. 8A and 8B. For example, the mesh structure may include only mesh lines extending in the first direction DR1 and the second direction DR2, or may include mesh lines extending in the first direction DR1, the second direction DR2, the first crossing direction CDR1, and the second crossing direction CDR2. In other words, the mesh structure may be modified in various suitable forms as needed or desired.

Figure 9A:
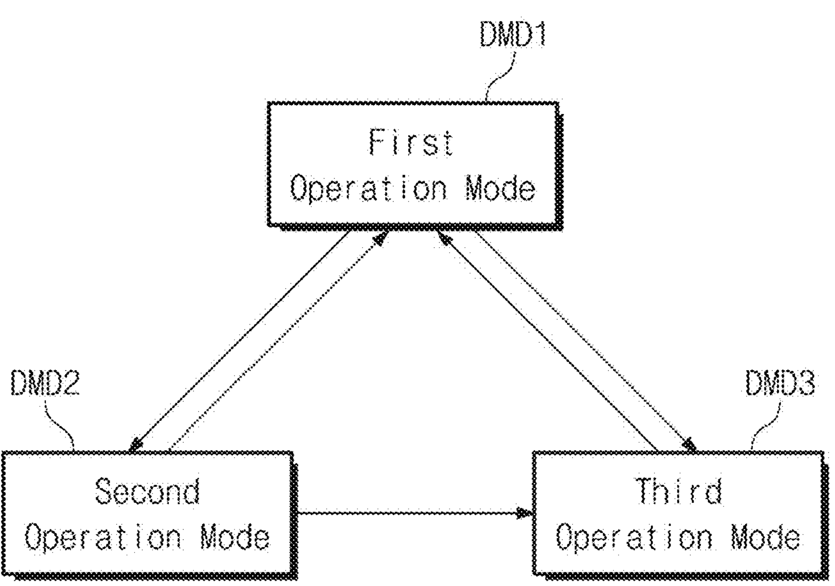
FIG. 9A is a view illustrating an operation of a sensor driver according to an embodiment of the present disclosure.

FIG. 9A is a view illustrating an operation of the sensor driver 200C according to an embodiment of the present disclosure.

Referring to FIGS. 3 and 9A, the sensor driver 200C may be selectively driven in one of a first operation mode DMD1, a second operation mode DMD2, and a third operation mode DMD3.

The first operation mode DMD1 may be referred to as a touch and pen standby mode, the second operation mode DMD2 may be referred to as a touch activation and pen standby mode, and the third operation mode DMD3 may be referred to as a pen activation mode. The first operation mode DMD1 may be a mode in which the sensor driver 200C waits for the first input 2000 and the second input 3000. The second operation mode DMD2 may be a mode in which the sensor driver 200C senses the first input 2000, and waits for the second input 3000. The third operation mode DMD3 may be a mode in which the sensor driver 200C senses the second input 3000.

In an embodiment of the present disclosure, the sensor driver 200C may first be driven in the first operation mode DMD1. When the first input 2000 is sensed in the first operation mode DMD1, the sensor driver 200C may be switched (e.g., changed) to the second operation mode DMD2. As another example, when the second input 3000 is sensed in the first operation mode DMD1, the sensor driver 200C may be switched (e.g., changed) to the third operation mode DMD3.

In an embodiment of the present disclosure, when the second input 3000 is sensed in the second operation mode DMD2, the sensor driver 200C may be switched to the third operation mode DMD3. When the first input 2000 is released (e.g., not sensed) in the second operation mode DMD2, the sensor driver 200C may be switched to the first operation mode DMD1. When the second input 3000 is released (e.g., not sensed) in the third operation mode DMD3, the sensor driver 200C may be switched to the first operation mode DMD1.

Figure 9B:
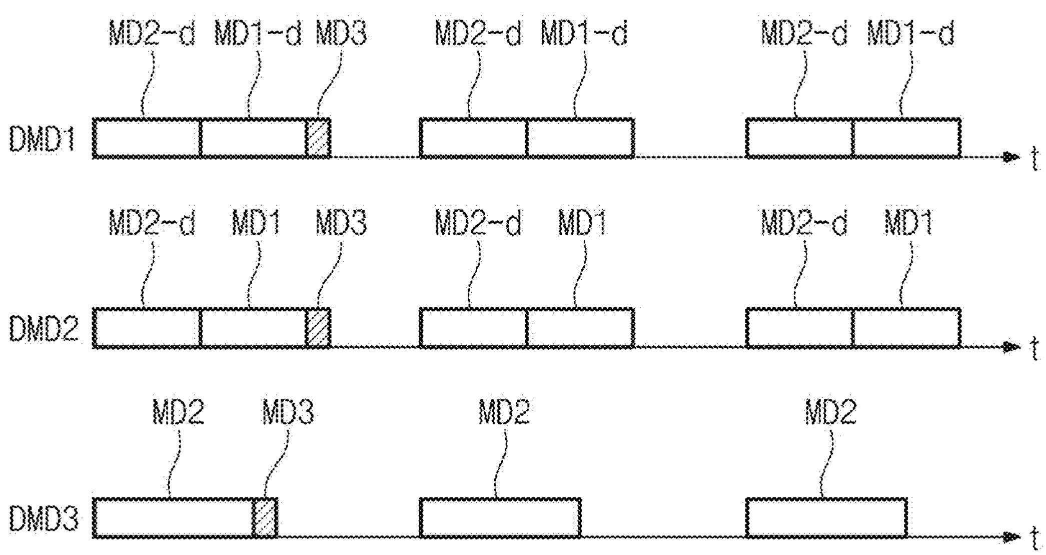
FIG. 9B is a view illustrating an operation of the sensor driver according to an embodiment of the present disclosure.

FIG. 9B is a view illustrating an operation of the sensor driver 200C according to an embodiment of the present disclosure.

Referring to FIGS. 3, 9A, and 9B, operations in the first to third operation modes DMD1, DMD2, and DMD3 are illustrated in the order of time (t).

In the first operation mode DMD1, the sensor driver 200C may be repeatedly driven in a second mode MD2-*d* and a first mode MD1-*d*. During the second mode MD2-*d*, the sensor layer 200 may be scan-driven to detect the second input 3000. During the first mode MD1-*d*, the sensor layer 200 may be scan-driven to detect the first input 2000. Although FIG. 9B illustrates an example in which the sensor driver 200C operates in the first mode MD1-*d* continuously after the second mode MD2-*d*, the sequence there of is not limited thereto.

In the second operation mode DMD2, the sensor driver 200C may be repeatedly driven in a second mode MD2-*d* and a first mode MD1. During the second mode MD2-*d*, the sensor layer 200 may be scan-driven to detect the second input 3000. During the first mode MD1, the sensor layer 200 may be scan-driven to detect the coordinates by the first input 2000.

In the third operation mode DMD3, the sensor driver 200C may be driven in a second mode MD2. During the second mode MD2, the sensor layer 200 may be scan-driven to detect the coordinates by the second input 3000. In the third operation mode DMD3, the sensor driver 200C may not operate in the first mode MD1-D or MD1 until the second input 3000 is released (e.g., not sensed).

Each of the first operation mode DMD1, the second operation mode DMD2, and the third operation mode DMD3 may further include a third mode MD3. The third mode MD3 may be a mode for sensing whether or not the sensor layer 200 is folded, or for sensing the folding angle of the sensor layer 200. The third mode MD3 may be repeated every suitable period (e.g., every predetermined period). For example, the frequency of an operation of sensing whether or not the sensor layer 200 is folded, or the degree to which the sensor layer 200 is folded, may be lower than the frequency of an operation of sensing the first input 2000 or the second input 3000. Accordingly, the operation period of the third mode MD3 may be greater than or equal to the operation period of the first mode MD1-*d* or MD1 and the operation period of the second mode MD2-*d* or MD-2.

Figure 10:
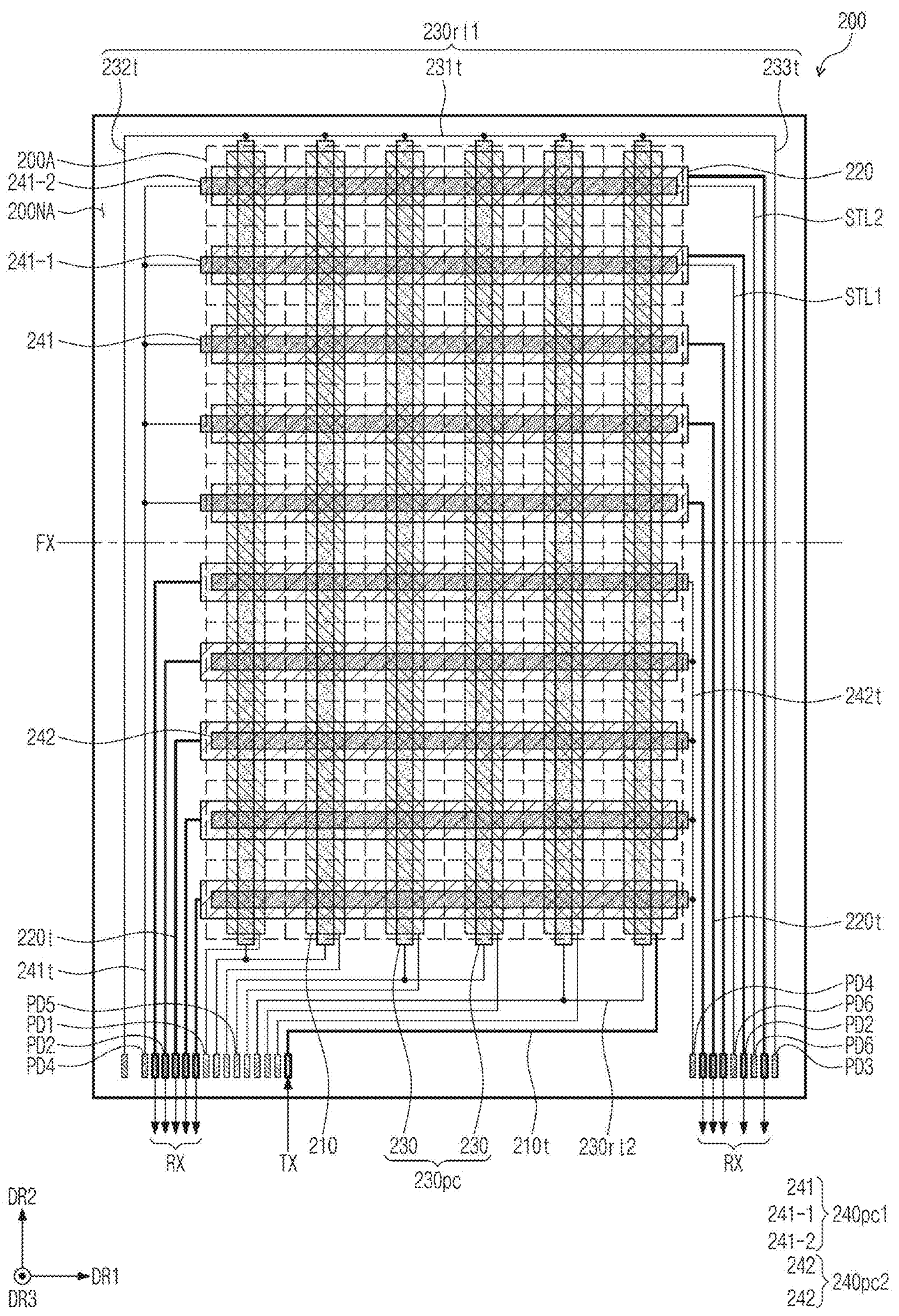
FIG. 10 is a view illustrating a first mode according to an embodiment of the present disclosure.

FIG. 10 is a view illustrating the first mode MD1-*d* or MD1 according to an embodiment of the present disclosure.

Referring to FIGS. 3, 9B, and 10, the first mode MD1-*d* of the first operation mode DMD1 and the first mode MD1 of the second operation mode DMD2 may include a mutual capacitance detection mode. FIG. 10 is a view illustrating the mutual capacitance detection mode in the first mode MD1-*d* of the first operation mode DMD1 and the first mode MD1 of the second operation mode DMD2.

In the mutual capacitance detection mode, the sensor driver 200C may sequentially provide a transmission signal TX to the first electrodes 210, and may detect the coordinates for the first input 2000 using a reception signal RX detected through the second electrodes 220. For example, the sensor driver 200C may sense a change in a mutual capacitance between the first electrodes 210 and the second electrodes 220, and may calculate input coordinates.

FIG. 10 illustrates an example in which the transmission signal TX is provided to one first electrode 210, and the reception signal RX is output from the second electrodes 220. The sensor driver 200C may sense a change in the capacitance between the first electrode 210 and each of the second electrodes 220, and may detect the input coordinates for the first input 2000.

In the first mode MD1-*d* of the first operation mode DMD1 and the first mode MD1 of the second operation mode DMD2, the charging electrodes 230 and the auxiliary electrodes 240 may all be grounded. Accordingly, a noise may be prevented or substantially prevented from being introduced into the first electrode 210 or the second electrode 220 through the charging electrodes 230 and the auxiliary electrodes 240.

In an embodiment of the present disclosure, at least one of the first mode MD1-*d* of the first operation mode DMD1 or the first mode MD1 of the second operation mode DMD2 may further include a self-capacitance detection mode. In the self-capacitance detection mode, the sensor driver 200C may calculate input coordinates by outputting driving signals to the first electrodes 210 and the second electrodes 220, and sensing a change in the capacitance of each of the first electrodes 210 and the second electrodes 220. In the self-capacitance detection mode, the charging electrodes 230 and the auxiliary electrodes 240 may be grounded.

Figure 11:
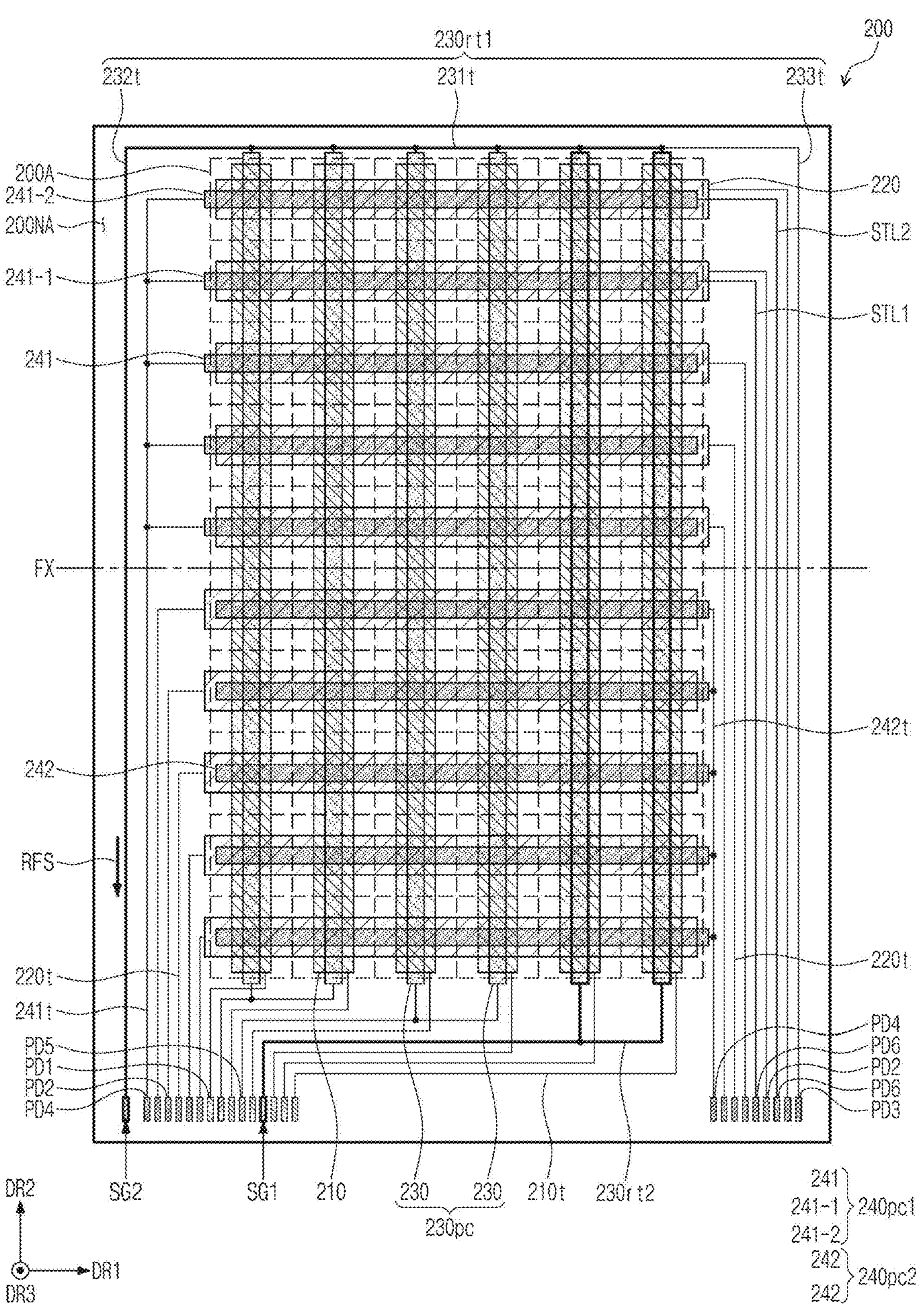
FIG. 11 is a view illustrating a second mode according to an embodiment of the present disclosure.
Figure 12A:
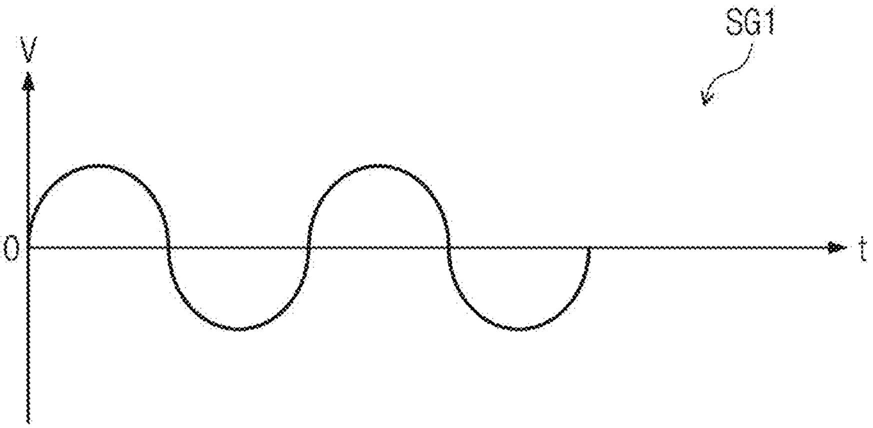
FIG. 12A is a graph depicting a waveform of a first signal according to an embodiment of the present disclosure.
Figure 12B:
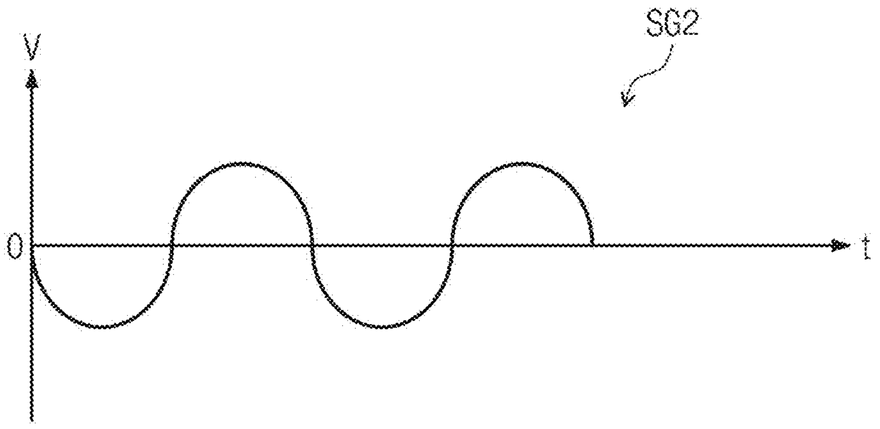
FIG. 12B is a graph depicting a waveform of a second signal according to an embodiment of the present disclosure.

FIG. 11 is a view illustrating the second mode MD2-*d* or MD2 according to an embodiment of the present disclosure. FIG. 12A is a graph depicting a waveform of a first signal SG1 according to an embodiment of the present disclosure. FIG. 12B is a graph depicting a waveform of a second signal SG2 according to an embodiment of the present disclosure.

Referring to FIGS. 9, 11, 12A, and 12B, the second mode MD2 may include a charging driving mode. The charging driving mode may include a searching charging driving mode and a tracking charging driving mode.

The searching charging driving mode may be a driving mode before the position of the pen PN is sensed. Accordingly, the first signal SG1 or the second signal SG2 may be sequentially provided to all channels included in the sensor layer 200. In other words, in the searching charging driving mode, the entire area of the sensor layer 200 may be scanned. When the pen PN (e.g., refer to FIG. 3) is sensed in the searching charging driving mode, the sensor layer 200 may be driven in the tracking charging driving mode. For example, in the tracking charging driving mode, the sensor driver 200C may sequentially output the first signal SG1 and the second signal SG2 to an area overlapping with the point where the pen PN is sensed, rather than the entire sensor layer 200.

In the charging driving mode, the sensor driver 200C may apply the first signal SG1 to one pad, and may apply the second signal SG2 to another pad. The second signal SG2 may be an inverse signal of the first signal SG1. For example, the first signal SG1 may be a sinusoidal signal.

Because the first signal SG1 and the second signal SG2 are applied to at least two pads, a current RFS may have a current path to flow through one pad to another pad. In addition, because the first signal SG1 and the second signal SG2 may be sinusoidal signals having an inverse phase relationship with each other, the direction of the current RFS may be periodically varied. In an embodiment of the present disclosure, the first signal SG1 and the second signal SG2 may be square-wave signals having an inverse phase relationship with each other.

When the first signal SG1 and the second signal SG2 have an inverse phase relationship with each other, a noise caused in the display layer 100 (e.g., refer to FIG. 3) by the first signal SG1 may be cancelled out by noise caused by the second signal SG2. Thus, a flicker phenomenon may not occur in the display layer 100, and a display quality of the display layer 100 may be improved.

In an embodiment of the present disclosure, the first signal SG1 may be a sinusoidal signal. However, the present disclosure is not limited thereto, and the first signal SG1 may be a square-wave signal. The second signal SG2 may have a suitable constant voltage (e.g., a certain or predetermined constant voltage). For example, the second signal SG2 may be a ground voltage. In other words, a pad to which the second signal SG2 is applied may be regarded as being grounded. Even in this case, the current RFS may flow from one pad to another pad. In addition, even though the other pad is grounded, the direction of the current RFS may be periodically varied because the first signal SG1 is a sinusoidal signal or a square-wave signal.

Referring to FIG. 11, the first signal SG1 is provided to one pad connected with one second loop trace line 230*rt*2, and the second signal SG2 is provided to one pad connected with the first loop trace line 230*rt*1. The current RFS may flow along the current path defined by the one second loop trace line 230*rt*2, one charging electrode group 230*pc* connected to the one second loop trace line 230*rt*2, and a portion of the first loop trace line 230*rt*1. The current path may have a coil shape. Accordingly, in the charging driving mode of the second mode, the resonance circuit of the pen PN may be charged by a magnetic field formed by the current path.

In an embodiment of the present disclosure, a signal may not be applied to pads to which the first signal SG1 and the second signal SG2 are not applied, from among the third pads PD3 and the fifth pads PD5. In other words, first ends of charging electrode groups 230*pc* connected to the fifth pads PD5 that do not receive the first signal SG1 or the second signal SG2 among the charging electrode groups 230*pc* may be expressed as being floated. The expression, "first ends are floated," may mean that a signal is not applied to the fifth pads PD5 connected with the first ends of the charging electrode groups 230*pc*.

According to the present disclosure, a current path having a loop coil pattern may be implemented by the components included in the sensor layer 200. Accordingly, the electronic device 1000 (e.g., refer to FIG. 1A) may charge the pen PN using the sensor layer 200. Thus, a component having a coil for charging the pen PN may not be separately added, so that an increase in the thickness and weight of the electronic device 1000 and a decrease in the flexibility of the electronic device 1000 due to the addition of a separately added component may not occur.

In the charging driving mode, the first electrodes 210, the second electrodes 220, and the auxiliary electrodes 240 may be grounded or electrically floated, or may receive a constant or substantially constant voltage. In more detail, the first electrodes 210, the second electrodes 220, and the auxiliary electrodes 240 may be floated. In other words, a signal may not be provided to the pads connected to the first electrodes 210, the second electrodes 220, and the auxiliary electrodes 240. In this case, the current RFS may not flow to the first electrodes 210, the second electrodes 220, and the auxiliary electrodes 240.

Figure 13A:
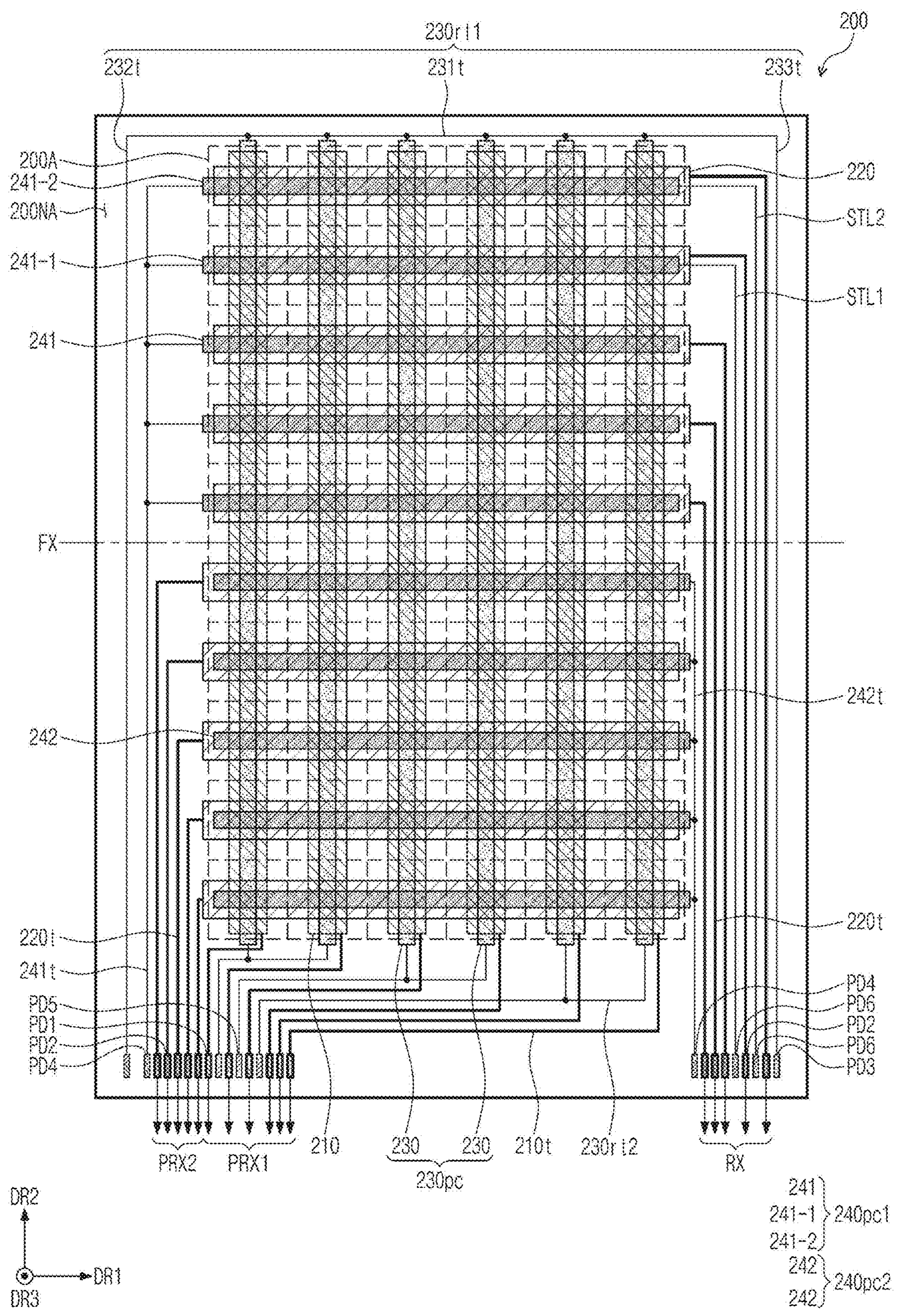
FIG. 13A is a view illustrating the second mode according to an embodiment of the present disclosure.
Figure 13B:
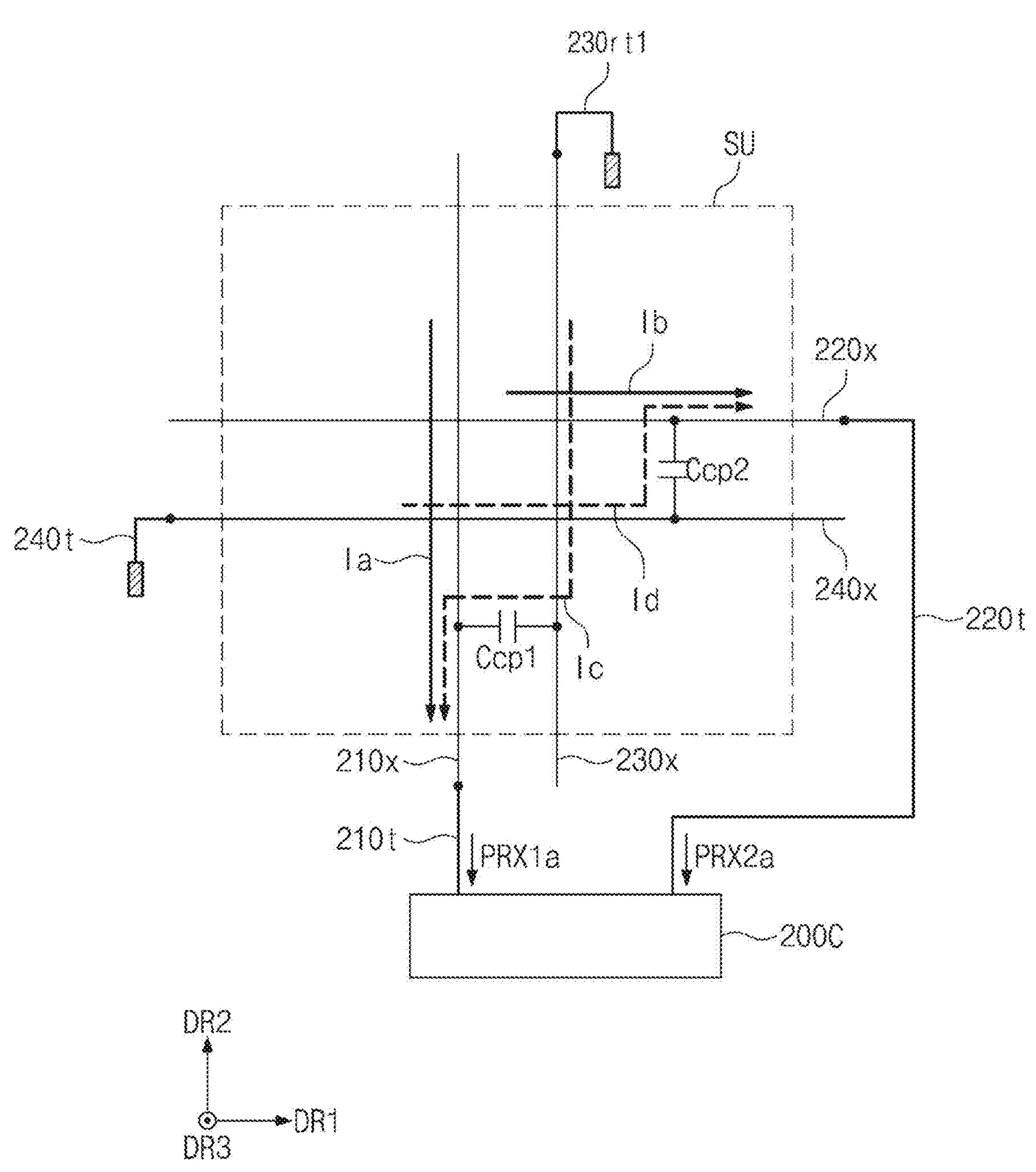
FIG. 13B is a view illustrating the second mode based on a sensing unit according to an embodiment of the present disclosure.

FIG. 13A is a view illustrating the second mode MD2-*d* or MD2 according to an embodiment of the present disclosure. FIG. 13B is a view illustrating the second mode MD2-*d* or MD2 based on a sensing unit SU according to an embodiment of the present disclosure.

Referring to FIGS. 13A and 13B, the second mode may include a charging driving mode and a pen sensing driving mode. FIGS. 13A and 13B are views illustrating the pen sensing driving mode. Referring to FIG. 13A, in the pen sensing driving mode, first reception signals PRX1 may be output from the first electrodes 210, and second reception signals PRX2 may be output from the second electrodes 220. In FIG. 13B, one sensing unit SU through which first to fourth induced currents Ia, Ib, Ic, and Id generated by the pen PN flow is illustrated.

In an embodiment of the present disclosure, the routing directions of one electrode and another electrode of the sensor layer 200 that overlap with each other may be different from each other. For example, the routing direction of a first electrode 210*x* and the routing direction of a charging electrode 230*x* may be different from each other. In addition, the routing direction of a second electrode 220*x* and the routing direction of an auxiliary electrode 240*x* may be different from each other. For example, in FIG. 13B, the first electrode 210*x* and the first trace line 210*t* may be connected on the lower side of the sensing unit SU, and the charging electrode 230*x* and the first loop trace line 230*rt*1 may be connected on the upper side of the sensing unit SU. The second electrode 220*x* and the second trace line 220*t* may be connected on the right side of the sensing unit SU, and the auxiliary electrode 240*x* and the auxiliary trace line 240*t* may be connected on the left side of the sensing unit SU.

The RLC resonance circuit of the pen PN may emit a magnetic field having a resonant frequency while discharging charged charges. Due to the magnetic field provided by the pen PN, the first induced current Ia may be generated in the first electrode 210*x*, and the second induced current Ib may be generated in the second electrode 220*x*. In addition, the third induced current Ic may be generated in the charging electrode 230*x*, and the fourth induced current Id may be generated in the auxiliary electrode 240*x*.

A first coupling capacitance Ccp1 may be formed between the charging electrode 230*x* and the first electrode 210*x*, and a second coupling capacitance Ccp2 may be formed between the auxiliary electrode 240*x* and the second electrode 220*x*. The third induced current Ic may be transferred to the first electrode 210*x* through the first coupling capacitor Ccp1, and the fourth induced current Id may be transferred to the second electrode 220*x* through the second coupling capacitor Ccp2.

The sensor driver 200*c* may receive a first reception signal PRX1 based on the first induced current Ia and the third induced current Ic from the first electrode 210*x*, and may receive a second reception signal PRX2 based on the second induced current Ib and the fourth induced current Id from the second electrode 220x. The sensor driver 200C may detect the input coordinates of the pen PN, based on the first reception signal PRX1a and the second reception signal PRX2a.

When the sensor driver 200C receives the first reception signal PRX1a from the first electrode 210x and receives the second reception signal PRX2a from the second electrode 220x, first ends of the charging electrode 230x and the auxiliary electrode 240x may all be floated. Accordingly, a compensation for a sensing signal may be maximized or improved by a coupling between the first electrode 210x and the charging electrode 230x, and a coupling between the second electrode 220x and the auxiliary electrode 240x.

In addition, second ends of the charging electrode 230x and the auxiliary electrode 240x may be grounded or floated. Accordingly, the third induced current Ic and the fourth induced current Id may be sufficiently transferred to the first electrode 210x and the second electrode 220x by the coupling between the first electrode 210x and the charging electrode 230x, and the coupling between the second electrode 220x and the auxiliary electrode 240x. When the first and second ends of the charging electrode 230x and the auxiliary electrode 240x are all floated, even though charges are charged to the charging electrode 230x in the charging driving mode, the potential may not rapidly change during the pen sensing operation because of the floating. Accordingly, a noise caused by a change in the driving mode may be minimized or reduced.

Figure 14:
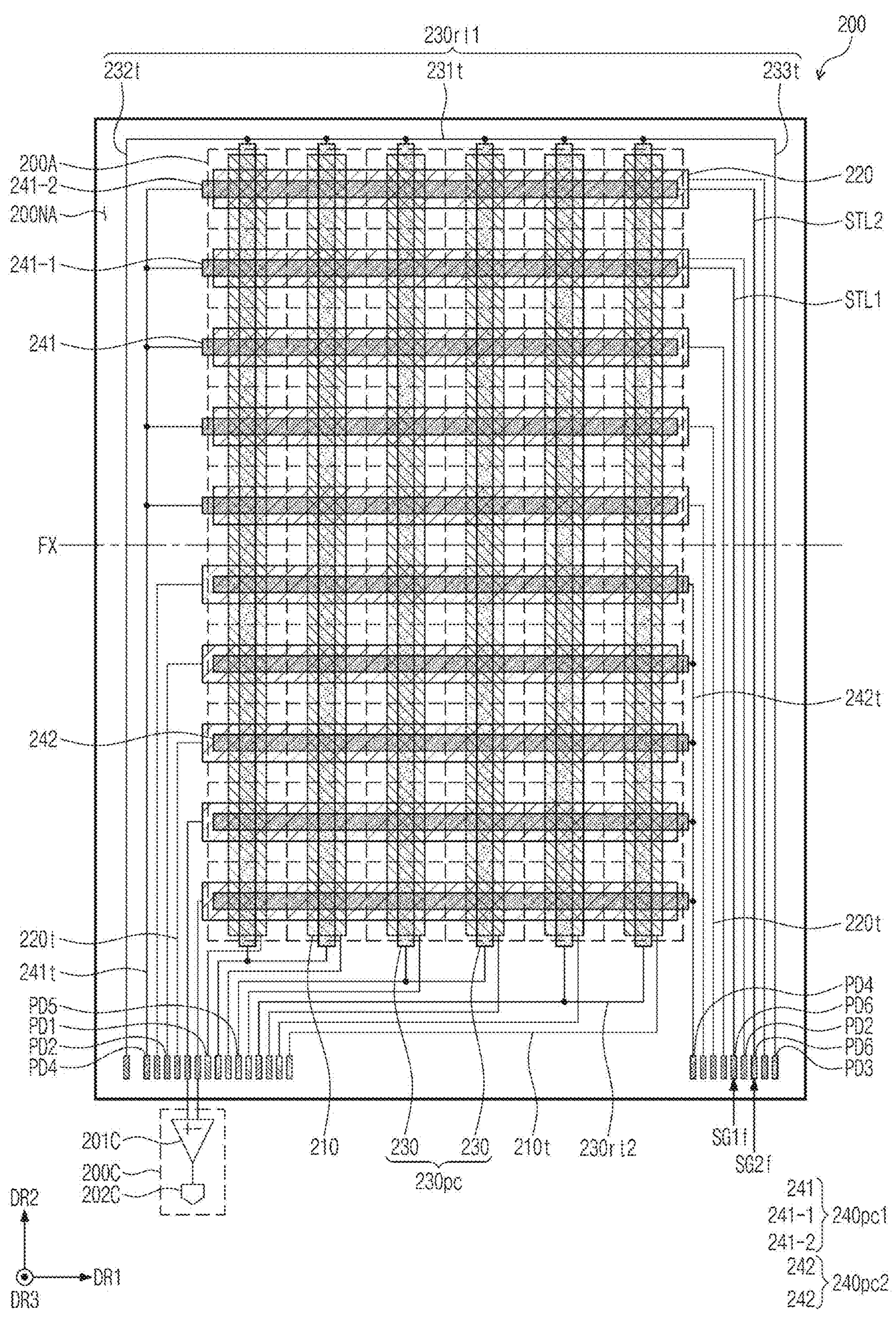
FIG. 14 is a view illustrating a third mode according to an embodiment of the present disclosure.
Figure 15:
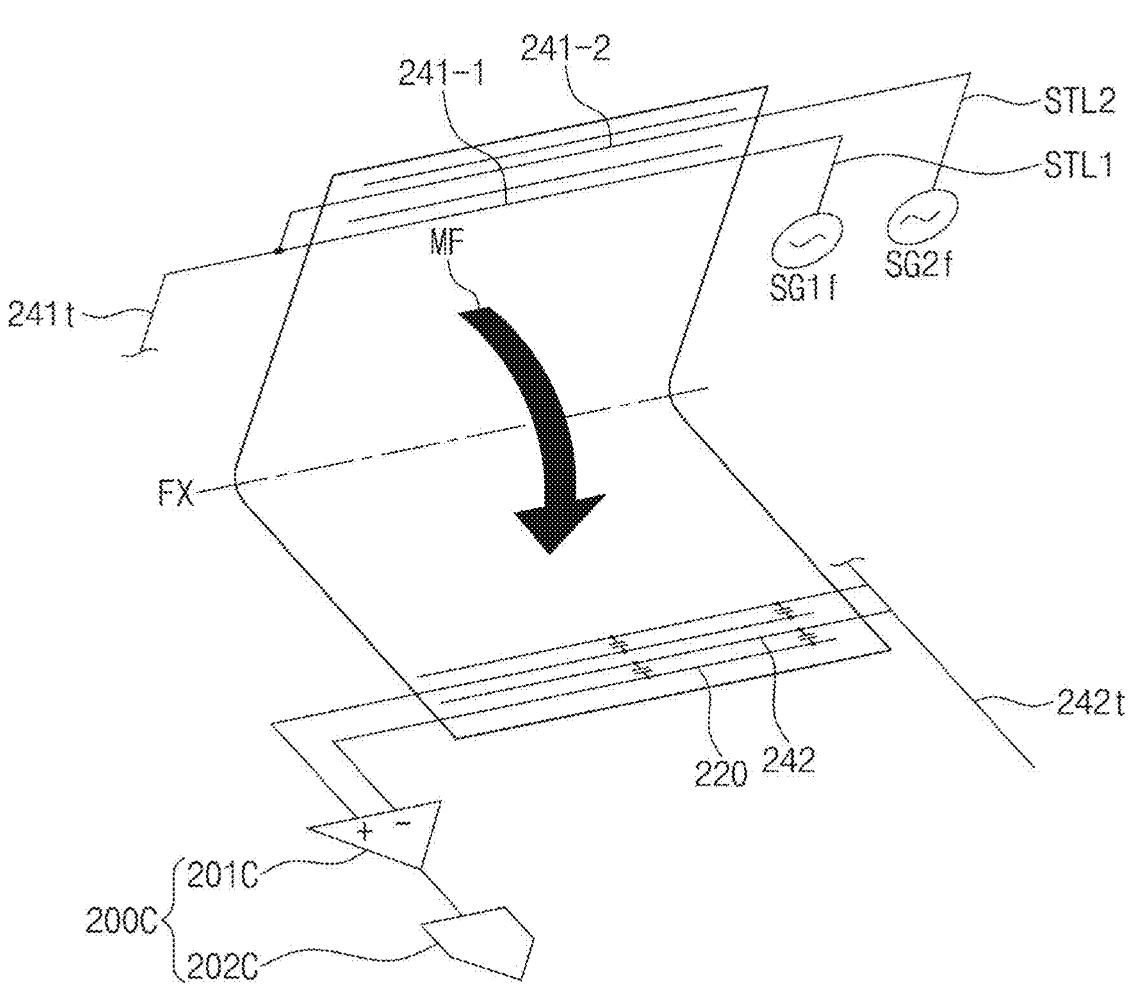
FIG. 15 is a view illustrating an operation of the third mode according to an embodiment of the present disclosure.

FIG. 14 is a view illustrating the third mode MD3 according to an embodiment of the present disclosure. FIG. 15 is a view illustrating an operation of the third mode MD3 according to an embodiment of the present disclosure.

Referring to FIGS. 9B, 14, and 15, in the third mode MD3, the sensor driver 200C may provide a first signal SG1f to the first signal transmission line STL1, and may provide a second signal SG2f to the second signal transmission line STL2. The second signal SG2f may be an inverse signal of the first signal SG1f, and the first signal SG1f and the second signal SG2f may be the same signals as that of the first signal SG1 and the second signal SG2 described above with reference to FIGS. 11 to 12B. However, the present disclosure is not limited thereto, and the first signal SG1f and the second signal SG2f may be signals different from those of the first signal SG1 and the second signal SG2.

According to an embodiment of the present disclosure, in the third mode MD3, the sensor driver 200C may not provide a signal to the first auxiliary trace line 241t. In other words, one end of the first auxiliary trace line 241t, for example, such as the fourth pad PD4, may be in a floated state. Accordingly, in the third mode MD3, a loop for folding sensing may be provided by the first signal transmission line STL1, the first-first auxiliary electrode 241-1, a portion of the first auxiliary trace line 241t, the first-second auxiliary electrode 241-2, and the second signal transmission line STL2. As a suitable signal (e.g., a certain or predetermined signal) is provided to the loop for folding sensing, a magnetic field MF may be generated.

When the sensor layer 200 is folded about the folding axis FX, an induced current may be generated in at least some of the second electrodes 220 by the magnetic field MF. In other words, the sensor driver 200C may sense whether or not the sensor layer 200 is folded, or the degree to which the sensor layer 200 is folded, by sensing the induced current induced in the second electrodes 220 by the first-first auxiliary electrode 241-1 and the first-second auxiliary electrode 241-2.

In addition, when the sensor driver 200C senses the induced current from the second electrodes 220, the second auxiliary trace line 242t may be floated or grounded. Accordingly, a signal level of the induced current may be increased by the coupling between the second electrodes 220 and the second auxiliary electrodes 242.

In an embodiment of the present disclosure, the sensor driver 200C may further include an analog front end 201C and an analog-to-digital converter 202C that are electrically connected with at least two second electrodes 220 among the second electrodes 220 in the third mode MD3. The sensor driver 200C may sense whether or not the sensor layer 200 is folded, or the degree to which the sensor layer 200 is folded, by using an induced current received or sensed from the at least two second electrodes 220.

Although FIG. 14 illustrates an example in which folding is sensed using two second electrodes 220 disposed at the bottom in the sensing area 200A, the present disclosure is not particularly limited thereto. For example, a signal for sensing folding may be received through at least one other second electrode 220 that is adjacent to the folding axis FX. In this case, a sensing sensitivity may be improved, and thus, an accuracy in sensing whether or not the sensor layer 200 is folded, or in sensing the degree to which the sensor layer 200 is folded, may be further improved.

In an embodiment of the present disclosure, information about a folding angle depending on an intensity of the induced current may be stored in the sensor driver 200C or the main driver 1000C. For example, it may be determined that the sensor layer 200 is further folded as the intensity of the induced current is increased. Accordingly, an operation of the electronic device 1000 may be controlled depending on whether or not the sensor layer 200 is folded, or the degree to which the sensor layer 200 is folded. For example, when the sensor layer 200 is fully folded or is folded by 90 degrees or more from a flat or substantially flat state, the electronic device 1000 may enter an off state. As another example, when the sensor layer 200 is folded by an angle more than 0 degrees and less than or equal to 90 degrees from the flat or substantially flat state, an operation in which a screen displayed on the electronic device 1000 is divided with respect to the folding axis FX may be performed.

In an embodiment of the present disclosure, the electronic device 1000 (e.g., refer to FIG. 1A) may further include a hinge angle sensor that senses a folding angle. In this case, the hinge angle sensor may sense the folding angle. As such, a current sensed at a specific angle may be set as a folding threshold value, and when a current value sensed through the second electrodes 220 is greater than the folding threshold value, an operation of sensing folding using the sensor layer 200 may be stopped. Accordingly, a power consumption may be reduced. Thereafter, when the hinge angle sensor senses that the angle is greater than or equal to the specific angle, a folding sensing operation using the sensor layer 200 may be resumed.

Figure 16:
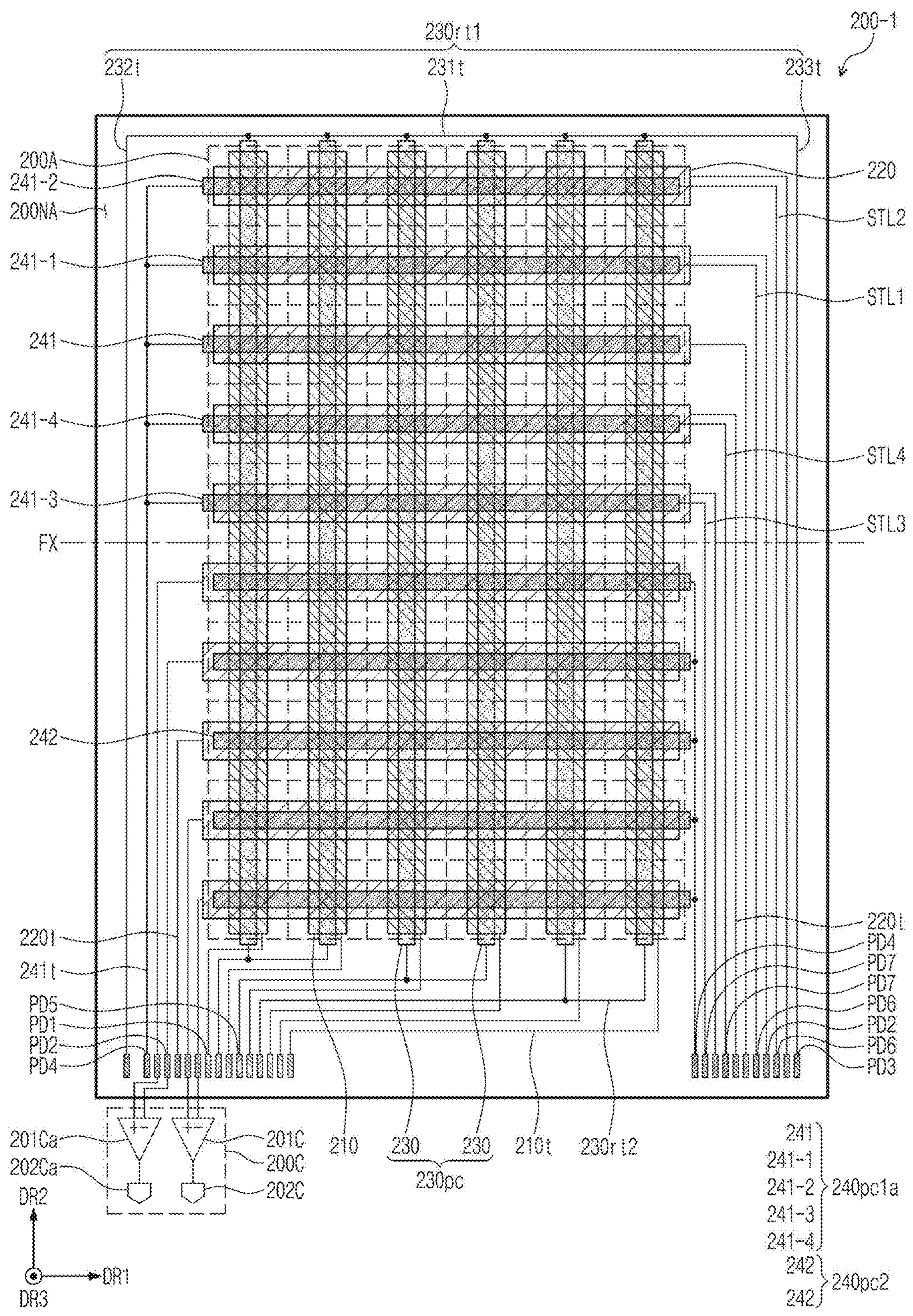
FIG. 16 is a plan view of a sensor layer according to an embodiment of the present disclosure.

FIG. 16 is a plan view of a sensor layer 200-1 according to an embodiment of the present disclosure. In FIG. 16, the components that are the same or substantially the same as those described above with reference to FIG. 5 are denoted with the same reference symbols, and thus, redundant description thereabout may not be repeated hereinafter.

Referring to FIG. 16, the sensor layer 200-1 may include a first electrode group 240pc1a and a second electrode group 240pc2 spaced apart from each other in the second direction DR2 with the folding axis FX therebetween. The sensor layer 200-1 may further include signal transmission lines STL1, STL2, STL3, and STL4 disposed in the peripheral area 200NA. The signal transmission lines STL1, STL2, STL3, and STL4 may include a first signal transmission line STL1, a second signal transmission line STL2, a third signal transmission line STL3, and a fourth signal transmission line STL4. The sensor layer 200-1 may further include seventh pads PD7 connected to the third and fourth signal transmission lines STL3 and STL4 in a one-to-one correspondence.

The first electrode group 240*pc*1*a* may include a plurality of first auxiliary electrodes 241, 241-1, 241-2, 241-3, and 241-4 arranged along the second direction DR2. The second electrode group 240*pc*2 may include a plurality of second auxiliary electrodes 242 arranged along the second direction DR2.

According to an embodiment of the present disclosure, the first auxiliary electrodes 241, 241-1, 241-2, 241-3, and 241-4 may include a first-first auxiliary electrode 241-1, a first-second auxiliary electrode 241-2, a first-third auxiliary electrode 241-3, a first-fourth auxiliary electrode 241-4, and an additional first auxiliary electrode 241.

According to an embodiment of the present disclosure, the first-first auxiliary electrode 241-1 may be electrically connected to the first signal transmission line STL1. The first-second auxiliary electrode 241-2 may be electrically connected to the second signal transmission line STL2. The first-third auxiliary electrode 241-3 may be electrically connected to the third signal transmission line STL3. The first-fourth auxiliary electrode 241-4 may be electrically connected to the fourth signal transmission line STL4. A first end of the additional first auxiliary electrode 241 may be connected to the first auxiliary trace line 241*t*, and a second end of the additional first auxiliary electrode 241 may be floated.

In an embodiment of the present disclosure, the third mode MD3 (e.g., refer to FIG. 9B) may include a first section mode and a second section mode.

In the first section mode, the sensor driver 200C may provide the first signal SG1*f* (e.g., refer to FIG. 14) and the second signal SG2*f*, which is an inverse signal of the first signal SG1*f*, to the first-first auxiliary electrode 241-1 and the first-second auxiliary electrode 241-2, respectively. In the second section mode, the sensor driver 200C may provide the second signal SG2*f*, which is an inverse signal of the first signal SG1*f*, to the first-third auxiliary electrode 241-3 and the first-fourth auxiliary electrode 241-4.

The sensor driver 200C may further include a first analog front end 201C and a first analog-to-digital converter 202C that are electrically connected with two second electrodes 220 among the second electrodes 220 in the third mode MD3, and a second analog front end 201Ca and a second analog-to-digital converter 202Ca that are electrically connected with other two second electrodes 220 among the second electrodes 220 in the third mode MD3.

In the first section mode, the sensor driver 200C may sense whether or not the sensor layer 200-1 is folded, or the degree to which the sensor layer 200-1 is folded, through the first analog front end 201C and the first analog-to-digital converter 202C. In the second section mode, the sensor driver 200C may sense whether or not the sensor layer 200-1 is folded, or the degree to which the sensor layer 200-1 is folded, through the second analog front end 201Ca and the second analog-to-digital converter 202Ca. However, the present disclosure is not particularly limited thereto. For example, in each of the first section mode and the second section mode, the sensor driver 200C may sense whether or not the sensor layer 200-1 is folded, or the degree to which the sensor layer 200-1 is folded, by using the first analog front end 201C, the first analog-to-digital converter 202C, the second analog front end 201Ca, and the second analog-to-digital converter 202Ca.

According to an embodiment of the present disclosure, the first-third auxiliary electrode 241-3 and the first-fourth auxiliary electrode 241-4 may be disposed closer to the folding axis FX than the first-first auxiliary electrode 241-1 and the first-second auxiliary electrode 241-2. Accordingly, when the first-third auxiliary electrode 241-3 and the first-fourth auxiliary electrode 241-4 are used, a smaller change in the folding angle may be sensed than when the first-first auxiliary electrode 241-1 and the first-second auxiliary electrode 241-2 are used. Thus, the first-first auxiliary electrode 241-1 and the first-second auxiliary electrode 241-2 may be used as sensors that sense folding, and the first-third auxiliary electrode 241-3 and the first-fourth auxiliary electrode 241-4 may be used as sensors that sense the folding angle.

In an embodiment of the present disclosure, the sensor driver 200C may be alternately driven in the first section mode and the second section mode in a time-division manner. For example, the third mode MD3 described above with reference to FIG. 9B may include both the first section mode and the second section mode.

In an embodiment of the present disclosure, the sensor driver 200C may operate in the first section mode, and then may selectively operate in the second section mode depending on the intensity of a sensed current. Accordingly, the second section mode may not always be operated (e.g., may be selectively operated), and thus, the power consumption of the electronic device 1000 (e.g., refer to FIG. 1A) may be reduced.

Figure 17:
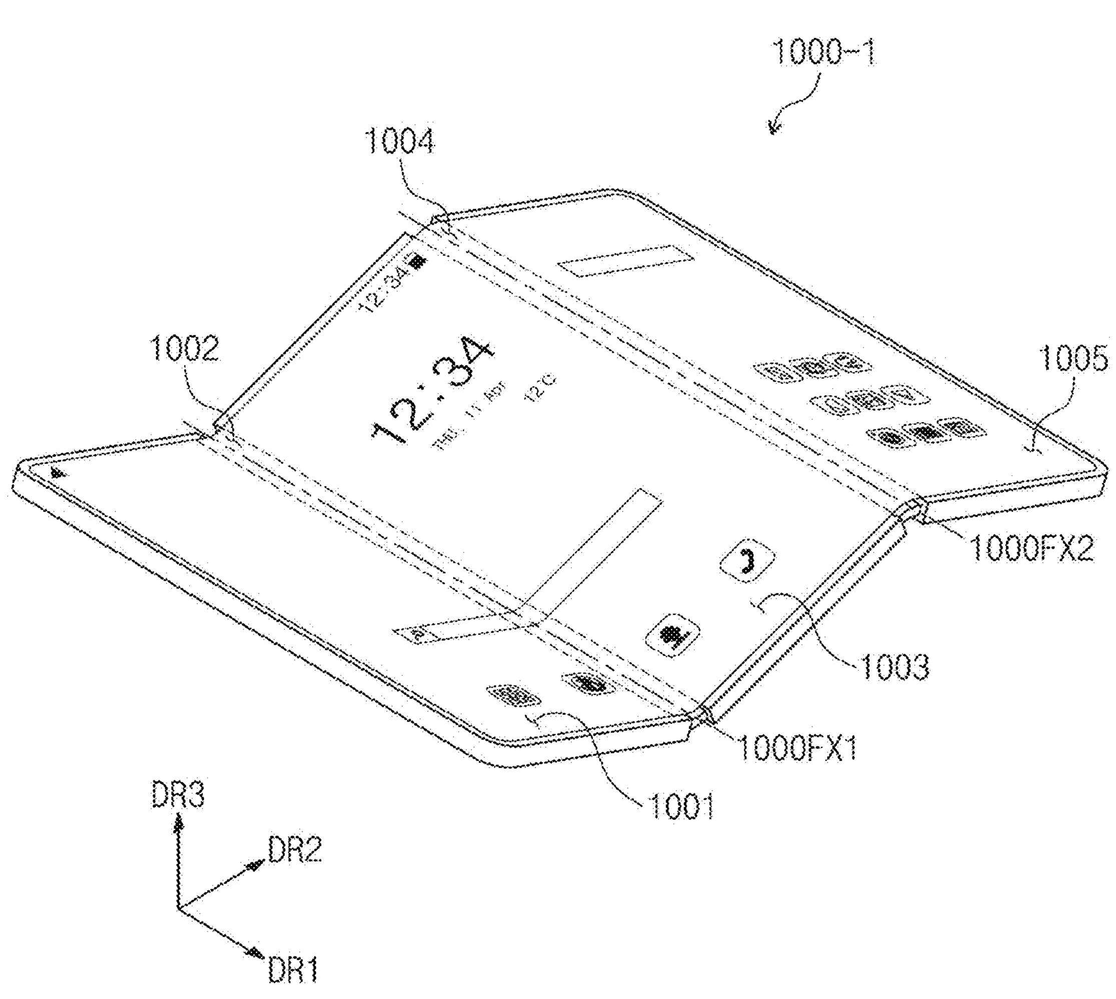
FIG. 17 is a perspective view of an electronic device according to an embodiment of the present disclosure.
Figure 18:
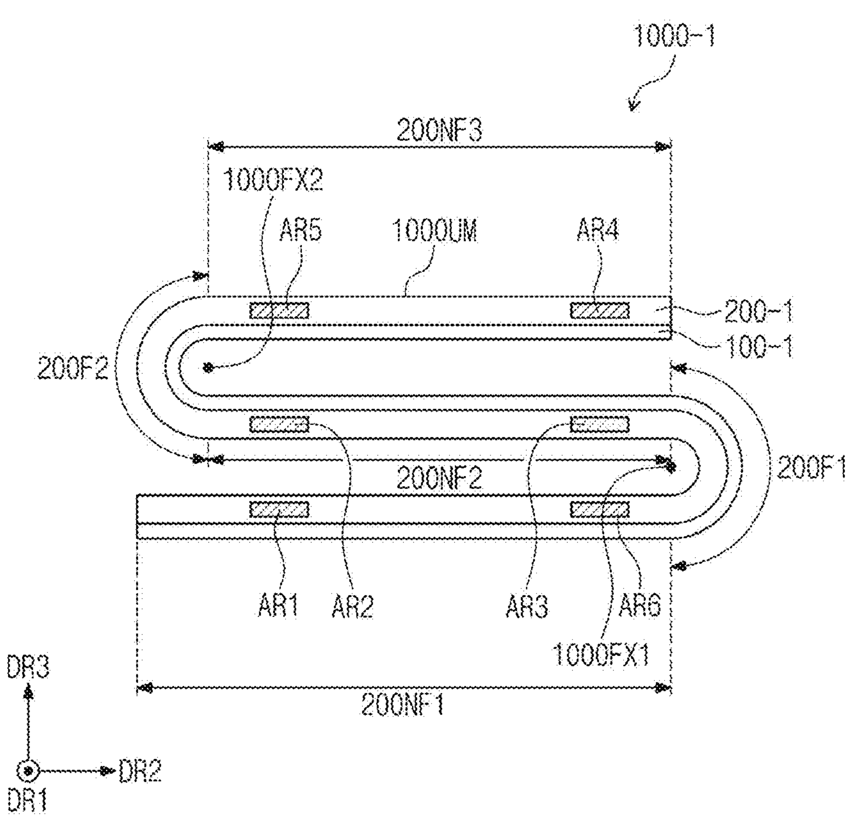
FIG. 18 is a schematic sectional view of an electronic device according to an embodiment of the present disclosure.

FIG. 17 is a perspective view of an electronic device 1000-1 according to an embodiment of the present disclosure. FIG. 18 is a schematic sectional view of the electronic device 1000-1 according to an embodiment of the present disclosure.

Referring to FIG. 17, the electronic device 1000-1 may be a foldable electronic device. The electronic device 1000-1 may be folded and unfolded about a first folding axis 1000FX1 and a second folding axis 1000FX2 that extend in the first direction DR1. First to fifth areas 1001, 1002, 1003, 1004, and 1005 may be defined in the electronic device 1000-1 along the second direction DR2. The first area 1001, the third area 1003, and the fifth area 1005 may be areas that are not folded, and may be referred to as non-folding areas. The second area 1002 and the fourth area 1004 may be foldable areas, and may be referred to as folding areas.

Referring to FIGS. 17 and 18, the electronic device 1000-1 may include a display layer 100-1 and a sensor layer 200-1. The sensor layer 200-1 may have a first non-folding area 200NF1, a first folding area 200F1, a second non-folding area 200NF2, a second folding area 200F2, and a third non-folding area 200NF3 defined therein. The first folding area 200F1 may be folded and unfolded about the first folding axis 1000FX1, and the second folding area 200F2 may be folded and unfolded about the second folding axis 1000FX2.

The first non-folding area 200NF1, the first folding area 200F1, the second non-folding area 200NF2, the second folding area 200F2, and the third non-folding area 200NF3 may correspond to the first to fifth areas 1001, 1002, 1003, 1004, and 1005 of the electronic device 1000-1 in a one-to-one manner. In an unfolded state of the electronic device 1000-1, the first non-folding area 200NF1, the first folding area 200F1, the second non-folding area 200NF2, the second folding area 200F2, and the third non-folding area 200NF3 may be sequentially defined in the second direction DR2.

When areas are divided from each other based on the top surface 1000UM of the electronic device 1000-1, the first folding axis 1000FX1 and the second folding axis 1000FX2 may be defined in the different areas. For example, the first folding axis 1000FX1 may be defined above the top surface 1000UM, and the second folding axis 1000FX2 may be defined below the top surface 1000UM.

When the electronic device 1000-1 is folded, the second area 1002 may be folded about the first folding axis 1000FX1 defined above the top surface 1000UM. Accordingly, the first area 1001 and the third area 1003 may face each other. When the electronic device 1000-1 is in a fully folded state, the first area 1001 and the third area 1003 may face each other, and this may be referred to as an in-folding operation.

When the electronic device 1000-1 is folded, the fourth area 1004 may be folded about the second folding axis 1000FX2 defined below the top surface 1000UM. Accordingly, the third area 1003 and the fifth area 1005 may face away from each other. When the electronic device 1000-1 is in the fully folded state, the fifth area 1005 may be exposed to the outside, and this may be referred to as an out-folding operation.

Referring to FIGS. 16 and 18, in an embodiment of the present disclosure, the first-first auxiliary electrode 241-1 and the first-second auxiliary electrode 241-2 may be disposed in the first non-folding area 200NF1. The first-third auxiliary electrode 241-3 and the first-fourth auxiliary electrode 241-4 may be disposed in the third non-folding area 200NF3. For example, the first-first auxiliary electrode 241-1 and the first-second auxiliary electrode 241-2 may be disposed in a first area AR1 of the first non-folding area 200NF1, and the first-third auxiliary electrode 241-3 and the first-fourth auxiliary electrode 241-4 may be disposed in a fourth area AR4 of the third non-folding area 200NF3.

In this case, the electronic device 1000-1 may sense whether or not the first folding area 200F1 is folded, or the degree to which the first folding area 200F1 is folded, by sensing a current induced in second electrodes 220 disposed in a second area AR2 of the second non-folding area 200NF2 that faces the first area AR1. In addition, the electronic device 1000-1 may sense whether or not the second folding area 200F2 is folded, or the degree to which the second folding area 200F2 is folded, by sensing a current induced in second electrodes 220 disposed in a third area AR3 of the second non-folding area 200NF2 that faces the fourth area AR4.

In an embodiment of the present disclosure, the first-first auxiliary electrode 241-1 and the first-second auxiliary electrode 241-2 may be disposed in the second non-folding area 200NF2, and the first-third auxiliary electrode 241-3 and the first-fourth auxiliary electrode 241-4 may be disposed in the second non-folding area 200NF2. For example, the first-first auxiliary electrode 241-1 and the first-second auxiliary electrode 241-2 may be disposed in the second area AR2, and the first-third auxiliary electrode 241-3 and the first-fourth auxiliary electrode 241-4 may be disposed in the third area AR3.

In this case, the electronic device 1000-1 may sense whether or not the first folding area 200F1 is folded, or the degree to which the first folding area 200F1 is folded, by sensing a current induced in the second electrodes 220 disposed in the first area AR1 that faces the second area AR2. Furthermore, the electronic device 1000-1 may sense whether or not the second folding area 200F2 is folded, or the degree to which the second folding area 200F2 is folded, by sensing a current induced in the second electrodes 220 disposed in a fifth area AR5 of the third non-folding area 200NF3 that faces the second area AR2.

The electronic device 1000-1 may sense whether or not the second folding area 200F2 is folded, or the degree to which the second folding area 200F2 is folded, by sensing a current induced in the second electrodes 220 disposed in the fourth area AR4 of the third non-folding area 200NF3 that faces the third area AR3. In addition, the electronic device 1000-1 may sense whether or not the first folding area 200F1 is folded, or the degree to which the first folding area 200F1 is folded, by sensing a current induced in the second electrodes 220 disposed in a sixth area AR6 of the first non-folding area 200NF1 that faces the third area AR3.

Figure 19:
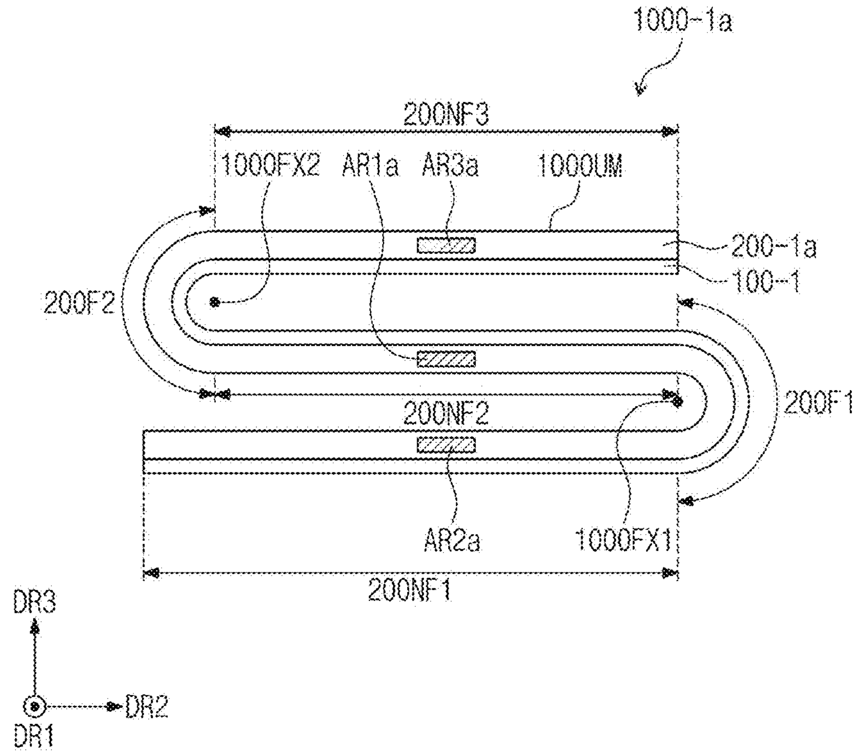
FIG. 19 is a schematic sectional view of an electronic device according to an embodiment of the present disclosure.

FIG. 19 is a schematic sectional view of an electronic device 1000-1*a* according to an embodiment of the present disclosure. In FIG. 19, the components that are the same or substantially the same as those described above with reference to FIG. 18 are denoted with the same reference symbols, and thus, redundant description thereabout may not be repeated hereinafter.

Referring to FIGS. 16 and 19, in an embodiment of the present disclosure, the first-first auxiliary electrode 241-1 and the first-second auxiliary electrode 241-2 may be disposed in a second non-folding area 200NF2. For example, the first-first auxiliary electrode 241-1 and the first-second auxiliary electrode 241-2 may be disposed in a first area AR1*a* included in the second non-folding area 200NF2 of a sensor layer 200-1*a*.

In this case, the electronic device 1000-1*a* may sense whether or not a first folding area 200F1 is folded, or the degree to which the first folding area 200F1 is folded, by sensing a current induced in the second electrodes 220 disposed in a second area AR2*a* of a first non-folding area 200NF1 that faces the first area AR1*a*. In addition, the electronic device 1000-1*a* may sense whether or not a second folding area 200F2 is folded, or the degree to which the second folding area 200F2 is folded, by sensing a current induced in the second electrodes 220 disposed in a third area AR3*a* of a third non-folding area 200NF3 that faces the first area AR1*a*.

As described above, the touch input as well as the pen input may be sensed using the sensor layer. Accordingly, a separate component (e.g., a digitizer) for sensing the pen may not need to be added to the electronic device, and thus, an increase in the thickness and the weight of the electronic device and a decrease in the flexibility of the electronic device due to an addition of a digitizer may not occur. In addition, the folding of the electronic device may be sensed using the sensor layer. Accordingly, a separate module for sensing the folding may be omitted, so that manufacturing costs may be reduced. In addition, because the separate module is omitted, a space may be secured.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:

a sensor layer configured to be folded or unfolded about a folding axis extending in a first direction; and a sensor driver configured to drive the sensor layer, wherein the sensor layer comprises:

a plurality of first electrodes along the first direction;

a plurality of second electrodes along a second direction crossing the first direction;

a first electrode group comprising a plurality of first auxiliary electrodes along the second direction;

a first auxiliary trace line electrically connected with the plurality of first auxiliary electrodes;

a first signal transmission line electrically connected with a first-first auxiliary electrode among the plurality of first auxiliary electrodes; and a second signal transmission line electrically connected with a first-second auxiliary electrode spaced from the first-first auxiliary electrode in the second direction among the plurality of first auxiliary electrodes, and wherein the sensor driver is configured to sense a folding of the sensor layer by sensing an induced current induced by the first-first auxiliary electrode and the first-second auxiliary electrode.

2. The electronic device of claim 1, wherein the sensor driver is configured to sense the folding based on at least the induced current received from at least some of the plurality of second electrodes.

3. The electronic device of claim 1, wherein the sensor layer comprises a sensing area, and a peripheral area adjacent to the sensing area, wherein the plurality of first electrodes, the plurality of second electrodes, and the first electrode group are located in the sensing area, wherein the first auxiliary trace line and the first signal transmission line are spaced from each other with the sensing area therebetween, and wherein the first auxiliary trace line and the second signal transmission line are spaced from each other with the sensing area therebetween.

4. The electronic device of claim 1, wherein the sensor driver is configured to selectively operates in a first mode to sense a touch input, a second mode to sense a pen input, and a third mode to sense the folding of the sensor layer, and wherein in the third mode, the sensor driver is configured to provide a first signal to the first signal transmission line, and a second signal to the second signal transmission line, the second signal being an inverse signal of the first signal.

5. The electronic device of claim 4, wherein an operation period of the third mode is greater than or equal to an operation period of the first mode.

6. The electronic device of claim 1, wherein the sensor layer further comprises:

a third signal transmission line electrically connected with a first-third auxiliary electrode among the plurality of first auxiliary electrodes; and a fourth signal transmission line electrically connected with a first-fourth auxiliary electrode spaced from the first-third auxiliary electrode in the second direction among the plurality of first auxiliary electrodes, and wherein the first-third auxiliary electrode and the first-fourth auxiliary electrode are closer to the folding axis than the first-first auxiliary electrode and the first-second auxiliary electrode.

7. The electronic device of claim 6, wherein the sensor driver is configured to sense the folding of the sensor layer in a mode comprising a first section mode and a second section mode, and wherein in the first section mode, the sensor driver is configured to provide a first signal and a second signal to the first-first auxiliary electrode and the first-second auxiliary electrode, respectively, the second signal being an inverse signal of the first signal, and wherein in the second section mode, the sensor driver is configured to provide the first signal and the second signal to the first-third auxiliary electrode and the first-fourth auxiliary electrode, respectively.

8. The electronic device of claim 1, wherein the sensor layer further comprises:

a second electrode group comprising a plurality of second auxiliary electrodes along the second direction; and a second auxiliary trace line electrically connected with the plurality of second auxiliary electrodes, and wherein the first electrode group and the second electrode group are spaced from each other with the folding axis therebetween.

9. The electronic device of claim 1, wherein the folding axis comprises a first folding axis extending in the first direction, and a second folding axis extending in the first direction and spaced from the first folding axis in the second direction, wherein the sensor layer is configured to be folded or unfolded about the first folding axis and the second folding axis, wherein the sensor layer comprises a first non-folding area, a first folding area, a second non-folding area, a second folding area, and a third non-folding area sequentially along the second direction, and wherein the first folding area is configured to be folded or unfolded about the first folding axis, and the second folding area is configured to be folded or unfolded about the second folding axis.

10. The electronic device of claim 9, wherein the first-first auxiliary electrode and the first-second auxiliary electrode are located in the second non-folding area.

11. The electronic device of claim 9, wherein the sensor layer further comprises:

a third signal transmission line electrically connected with a first-third auxiliary electrode among the plurality of first auxiliary electrodes; and a fourth signal transmission line electrically connected with a first-fourth auxiliary electrode spaced from the first-third auxiliary electrode in the second direction among the plurality of first auxiliary electrodes, and wherein the first-first auxiliary electrode and the first-second auxiliary electrode are located in the first non-folding area, and the first-third auxiliary electrode and the first-fourth auxiliary electrode are located in the second non-folding area or the third non-folding area.

12. The electronic device of claim 1, wherein the sensor layer further comprises a plurality of charging electrode groups along the first direction, and the plurality of charging electrode groups overlap with the plurality of first electrodes.

13. An electronic device comprising:

a sensor layer configured to be folded or unfolded about a folding axis extending in a first direction; and a sensor driver configured to drive the sensor layer by selectively operating in a first mode to sense a touch input, a second mode to sense a pen input, or a third mode to sense a folding of the sensor layer, wherein the sensor layer comprises:

a plurality of first electrodes along the first direction;

a plurality of second electrodes along a second direction crossing the first direction;

a first electrode group comprising a plurality of first auxiliary electrodes along the second direction;

a first auxiliary trace line electrically connected with the plurality of first auxiliary electrodes;

a first signal transmission line electrically connected with a first-first auxiliary electrode among the plurality of first auxiliary electrodes; and a second signal transmission line electrically connected with a first-second auxiliary electrode spaced from the first-first auxiliary electrode in the second direction among the plurality of first auxiliary electrodes, and wherein in the third mode, the sensor driver is configured to provide a first signal to the first signal transmission line, and a second signal to the second signal transmission line, the second signal being an inverse signal of the first signal.

14. The electronic device of claim 13, wherein an operation period of the third mode is greater than or equal to an operation period of the first mode.

15. The electronic device of claim 13, wherein in the third mode, the sensor driver is configured to sense the folding of the sensor layer by sensing an induced current induced in the plurality of second electrodes by the first-first auxiliary electrode and the first-second auxiliary electrode.

16. The electronic device of claim 13, wherein the sensor layer further comprises:

a third signal transmission line electrically connected with a first-third auxiliary electrode among the plurality of first auxiliary electrodes; and a fourth signal transmission line electrically connected with a first-fourth auxiliary electrode spaced from the first-third auxiliary electrode in the second direction among the plurality of first auxiliary electrodes, and wherein the first-third auxiliary electrode and the first-fourth auxiliary electrode are closer to the folding axis than the first-first auxiliary electrode and the first-second auxiliary electrode.

17. The electronic device of claim 13, wherein the sensor layer further comprises a plurality of charging electrode groups along the first direction, and the plurality of charging electrode groups overlap with the plurality of first electrodes.

18. An electronic device comprising:

a sensor layer configured to be folded or unfolded about a folding axis extending in a first direction; and a sensor driver configured to drive the sensor layer by selectively operating in a first mode to sense a touch input, a second mode to sense a pen input, or a third mode to sense a folding of the sensor layer, wherein the sensor layer comprises:

a plurality of first electrodes;

a plurality of second electrodes crossing the plurality of first electrodes; and a plurality of auxiliary electrodes extending in the first direction, and located along a second direction crossing the first direction, and wherein in the third mode, the sensor driver is configured to sense the folding of the sensor layer by sensing an induced current induced by at least two auxiliary electrodes among the plurality of auxiliary electrodes.

19. The electronic device of claim 18, wherein the sensor layer further comprises:

a first signal transmission line electrically connected with a first-first auxiliary electrode among the plurality of auxiliary electrodes; and a second signal transmission line electrically connected with a first-second auxiliary electrode spaced from the first-first auxiliary electrode in the second direction among the plurality of auxiliary electrodes, and wherein in the third mode, the sensor driver is configured to provide a first signal to the first signal transmission line, and a second signal to the second signal transmission line, the second signal being an inverse signal of the first signal.

20. The electronic device of claim 18, wherein the plurality of first electrodes are located along the first direction, and the plurality of second electrodes are located along the second direction, and wherein the sensor driver is configured to sense the folding based on at least the induced current received from at least some of the plurality of second electrodes.

* * * * *